US011912337B2

(12) United States Patent
Kinsman et al.

(10) Patent No.: US 11,912,337 B2
(45) Date of Patent: Feb. 27, 2024

(54) SIDE-BY-SIDE ALL TERRAIN VEHICLE

(71) Applicant: Polaris Industries Inc., Medina, MN (US)

(72) Inventors: Anthony J. Kinsman, Wyoming, MN (US); Angus M. Morison, Blaine, MN (US); Keith A. Hollman, Osceola, WI (US); Adam J. Schlangen, Rush City, MN (US); Richard D. Ripley, Rush City, MN (US); Brent A. Erspamer, Blaine, MN (US); Phillip Nowacki, White Bear Lake, MN (US)

(73) Assignee: Polaris Industries Inc., Medina, MN (US)

( * ) Notice: Subject to any disclaimer, the term of this patent is extended or adjusted under 35 U.S.C. 154(b) by 146 days.

(21) Appl. No.: 17/402,116

(22) Filed: Aug. 13, 2021

(65) Prior Publication Data
US 2022/0033004 A1 Feb. 3, 2022

Related U.S. Application Data

(63) Continuation of application No. 16/576,962, filed on Sep. 20, 2019, now Pat. No. 11,104,384, which is a
(Continued)

(51) Int. Cl.
*B60P 7/08* (2006.01)
*B62D 21/18* (2006.01)
(Continued)

(52) U.S. Cl.
CPC ............. *B62D 21/183* (2013.01); *B60G 3/20* (2013.01); *B60G 7/008* (2013.01); *B60G 7/02* (2013.01);
(Continued)

(58) Field of Classification Search
CPC .... B62D 21/183; B62D 21/12; B62D 23/005; B62D 27/065; B62D 33/02; B62D 33/06;
(Continued)

(56) References Cited

U.S. PATENT DOCUMENTS 3,422,918 A    1/1969   Musser et al.
4,046,403 A    9/1977   Yoshida
(Continued)

FOREIGN PATENT DOCUMENTS

CA         2416802 A1    10/2003
CA         2825896 A1     8/2012
(Continued)

OTHER PUBLICATIONS

"FIAT 500 Owner Handbook", Jul. 2001 (Jul. 2001), Fiat Group Automobiles S.p.A, Turin (IT).
(Continued)

*Primary Examiner* — Toan C To
(74) *Attorney, Agent, or Firm* — Faegre Drinker Biddle & Reath LLP

(57) ABSTRACT

A side by side vehicle is disclosed having a vehicle frame having frame tubes extending from a front to a rear. A vehicle seat frame is positioned in a mid portion of the frame, and positions a seat frame at a raised position relative to the frame tubes. A powertrain is positioned rearward of the vehicle seat frame and is coupled to the vehicle frame. Side by side seats are supported by the seat frame; and one or more storage units are positioned under the side by side seats. The side by side vehicle also has a rear suspension comprising at least one rear alignment arm coupled to each side of a rear of the vehicle frame, where the alignment arms are coupled to the vehicle frame at front and rear connection points. A distance between the front connection points is greater than a distance between the rear connection points,
(Continued)

and at least a portion of the powertrain is positioned between the front connection points of the alignment arms.

22 Claims, 36 Drawing Sheets

Related U.S. Application Data continuation of application No. 15/494,296, filed on Apr. 21, 2017, now Pat. No. 10,450,006, which is a continuation of application No. 13/370,139, filed on Feb. 9, 2012, now Pat. No. 9,650,078.

(60) Provisional application No. 61/442,071, filed on Feb. 11, 2011.

(51) Int. Cl.

| | | |
|---|---|---|
| *B60G 3/20* | (2006.01) | |
| *B60G 7/00* | (2006.01) | |
| *B60G 7/02* | (2006.01) | |
| *B60N 2/01* | (2006.01) | |
| *B60N 2/015* | (2006.01) | |
| *B62D 23/00* | (2006.01) | |
| *B62D 21/12* | (2006.01) | |
| *B62D 27/06* | (2006.01) | |
| *B62D 33/02* | (2006.01) | |
| *B62D 33/06* | (2006.01) | |
| *B60G 21/055* | (2006.01) | |

(52) U.S. Cl.
CPC .......... *B60G 21/055* (2013.01); *B60N 2/012* (2013.01); *B60N 2/015* (2013.01); *B60P 7/0807* (2013.01); *B62D 21/12* (2013.01); *B62D 23/005* (2013.01); *B62D 27/065* (2013.01); *B62D 33/02* (2013.01); *B62D 33/06* (2013.01); *B60G 2300/124* (2013.01); *B60G 2300/13* (2013.01); *B60Y 2200/20* (2013.01)

(58) Field of Classification Search
CPC . B60G 3/20; B60G 7/008; B60G 7/02; B60G 21/055; B60G 2300/124; B60G 2300/13; B60N 2/012; B60N 2/015; B60P 7/0807; B60Y 2200/20
See application file for complete search history.

(56) References Cited

U.S. PATENT DOCUMENTS

| | | | |
|---|---|---|---|
| 4,133,574 A | 1/1979 | Martin | |
| 4,344,718 A | 8/1982 | Taylor | |
| 4,650,210 A | 3/1987 | Hirose et al. | |
| 4,660,345 A | 4/1987 | Browning | |
| 4,691,818 A | 9/1987 | Weber | |
| 4,772,065 A | 9/1988 | Nakata et al. | |
| 4,817,985 A | 4/1989 | Enokimoto et al. | |
| 5,203,135 A | 4/1993 | Bastian | |
| 5,203,601 A | 4/1993 | Guillot | |
| 5,327,989 A | 7/1994 | Furuhashi et al. | |
| 5,465,929 A | 11/1995 | Dooley | |
| 5,642,957 A | 7/1997 | Lange | |
| 5,738,471 A | 4/1998 | Zentner et al. | |
| 5,752,791 A | 5/1998 | Ehrlich | |
| 5,816,650 A | 10/1998 | Lucas, Jr. | |
| 5,895,063 A | 4/1999 | Hasshi et al. | |
| 5,947,519 A | 9/1999 | Aloe et al. | |
| 5,975,624 A | 11/1999 | Rasidescu et al. | |
| 6,113,328 A | 9/2000 | Claucherty | |
| 6,134,841 A | 10/2000 | Schneider | |
| 6,257,797 B1 | 7/2001 | Lange | |
| 6,293,617 B1 | 9/2001 | Sukegawa | |
| 6,334,364 B1 * | 1/2002 | Suzuki | B60L 58/21 |
| | | | 180/444 |
| D467,200 S | 12/2002 | Luo et al. | |
| 6,530,730 B2 | 3/2003 | Swensen | |
| 6,533,348 B1 | 3/2003 | Jaekel et al. | |
| 6,582,004 B1 | 6/2003 | Hamm | |
| 6,652,020 B2 | 11/2003 | Few | |
| D497,324 S | 10/2004 | Chestnut et al. | |
| 6,805,217 B2 | 10/2004 | Kinouchi et al. | |
| D498,435 S | 11/2004 | Saito et al. | |
| 6,871,895 B2 | 3/2005 | Kiester et al. | |
| D503,657 S | 4/2005 | Katoh | |
| D503,905 S | 4/2005 | Saito et al. | |
| D504,638 S | 5/2005 | Tanaka et al. | |
| 6,892,847 B2 | 5/2005 | Seiki | |
| 6,926,350 B2 | 8/2005 | Gabbianelli et al. | |
| D511,317 S | 11/2005 | Tanaka et al. | |
| 7,014,241 B2 | 3/2006 | Toyota et al. | |
| 7,281,753 B2 | 10/2007 | Curtis et al. | |
| D555,036 S | 11/2007 | Eck | |
| 7,322,106 B2 | 1/2008 | Marando et al. | |
| D578,433 S | 10/2008 | Kawaguchi et al. | |
| D578,934 S | 10/2008 | Tanaka et al. | |
| 7,431,024 B2 | 10/2008 | Buchwitz et al. | |
| 7,481,610 B1 | 1/2009 | Egigian | |
| 7,488,022 B2 | 2/2009 | Belwafa et al. | |
| 7,503,737 B2 | 3/2009 | Sherman | |
| 7,510,199 B2 * | 3/2009 | Nash | B60K 6/52 |
| | | | 180/311 |
| D592,998 S | 5/2009 | Woodard et al. | |
| D595,613 S | 7/2009 | Lai et al. | |
| 7,578,544 B1 | 8/2009 | Shimamura et al. | |
| 7,581,780 B2 | 9/2009 | Shimamura et al. | |
| D604,201 S | 11/2009 | Kawaguchi et al. | |
| D605,555 S | 12/2009 | Tanaka et al. | |
| D606,900 S | 12/2009 | Flores | |
| D607,377 S | 1/2010 | Shimomura et al. | |
| 7,677,343 B2 | 3/2010 | Kitai et al. | |
| 7,677,646 B2 | 3/2010 | Nakamura | |
| 7,717,495 B2 | 5/2010 | Leonard et al. | |
| D621,423 S | 8/2010 | Nakanishi et al. | |
| D622,631 S | 8/2010 | Lai et al. | |
| 7,775,311 B1 * | 8/2010 | Hardy | B60L 50/71 |
| | | | 180/68.5 |
| 7,795,602 B2 | 9/2010 | Leonard et al. | |
| D624,848 S | 10/2010 | Shimomura | |
| D625,662 S | 10/2010 | Li | |
| 7,815,246 B2 | 10/2010 | Nakamura et al. | |
| 7,819,220 B2 | 10/2010 | Sunsdahl et al. | |
| 7,841,815 B1 | 11/2010 | Lane | |
| D631,395 S | 1/2011 | Tandrup et al. | |
| 7,874,606 B2 | 1/2011 | Yamamura et al. | |
| D633,006 S | 2/2011 | Sanschagrin et al. | |
| 7,913,505 B2 | 3/2011 | Nakamura | |
| D636,704 S | 4/2011 | Yoo et al. | |
| D640,598 S | 6/2011 | Zhang | |
| D641,288 S | 7/2011 | Sun | |
| D642,493 S | 8/2011 | Goebert et al. | |
| 7,988,210 B2 | 8/2011 | Shibata et al. | |
| 8,016,339 B2 | 9/2011 | Hamaguchi et al. | |
| 8,052,202 B2 | 11/2011 | Nakamura | |
| 8,100,434 B2 | 1/2012 | Miura | |
| 8,136,857 B2 | 3/2012 | Shimizu et al. | |
| 8,136,859 B2 | 3/2012 | Morita et al. | |
| 8,235,443 B2 | 8/2012 | Kokawa et al. | |
| 8,328,235 B2 | 12/2012 | Schneider et al. | |
| 8,376,441 B2 | 2/2013 | Nakamura et al. | |
| 8,511,732 B2 | 8/2013 | Inoue et al. | |
| D689,396 S | 9/2013 | Wang | |
| 8,556,324 B1 | 10/2013 | Yamamoto et al. | |
| 8,585,088 B1 | 11/2013 | Kaku et al. | |
| 8,596,405 B2 | 12/2013 | Sunsdahl et al. | |
| 8,613,337 B2 | 12/2013 | Kinsman et al. | |
| 8,640,814 B2 | 2/2014 | Deckard et al. | |
| 8,668,236 B1 | 3/2014 | Yamamoto et al. | |
| 8,672,387 B1 | 3/2014 | Kaku et al. | |
| D711,778 S | 8/2014 | Chun et al. | |
| D716,693 S | 11/2014 | Higashikawa | |
| D716,694 S | 11/2014 | Higashikawa | |

(56) References Cited

U.S. PATENT DOCUMENTS

| | | | |
|---|---|---|---|
| D717,695 S | 11/2014 | Matsumura | |
| 8,905,168 B2 * | 12/2014 | Kaku | B60K 20/02 |
| | | | 180/293 |
| D724,997 S | 3/2015 | Brew et al. | |
| 8,973,691 B2 | 3/2015 | Morgan et al. | |
| 8,973,693 B2 * | 3/2015 | Kinsman | B60R 21/13 |
| | | | 296/202 |
| 8,979,123 B1 * | 3/2015 | Takahashi | B62D 23/005 |
| | | | 280/756 |
| 8,997,908 B2 | 4/2015 | Kinsman et al. | |
| 9,004,532 B1 | 4/2015 | Hirooka | |
| D730,239 S | 5/2015 | Gonzalez | |
| D736,118 S | 8/2015 | Hashimoto et al. | |
| 9,150,182 B1 | 10/2015 | Schlangen et al. | |
| 9,216,777 B2 | 12/2015 | Nakamura et al. | |
| 9,242,680 B2 | 1/2016 | Schwab | |
| 9,266,417 B2 | 2/2016 | Nadeau et al. | |
| 9,279,234 B1 | 3/2016 | Gielda et al. | |
| 9,365,241 B1 * | 6/2016 | Taracko | B62D 21/155 |
| D764,972 S | 8/2016 | Gonzalez | |
| D767,444 S | 9/2016 | Chun et al. | |
| 9,650,078 B2 | 5/2017 | Kinsman et al. | |
| 9,789,909 B2 | 10/2017 | Erspamer et al. | |
| 9,789,922 B2 | 10/2017 | Dosenbach et al. | |
| 10,450,006 B2 | 10/2019 | Kinsman et al. | |
| 11,066,105 B2 | 7/2021 | Lutz et al. | |
| 2001/0031185 A1 | 10/2001 | Swensen | |
| 2003/0231926 A1 | 12/2003 | Thach | |
| 2005/0077098 A1 | 4/2005 | Takayanagi et al. | |
| 2005/0173177 A1 | 8/2005 | Smith et al. | |
| 2005/0279330 A1 | 12/2005 | Okazaki et al. | |
| 2006/0006696 A1 | 1/2006 | Umemoto et al. | |
| 2007/0170683 A1 | 7/2007 | Shimizu et al. | |
| 2007/0176386 A1 | 8/2007 | Schlangen et al. | |
| 2007/0210617 A1 | 9/2007 | Nakamura | |
| 2007/0214818 A1 | 9/2007 | Nakamura | |
| 2007/0267837 A1 | 11/2007 | Sanville | |
| 2008/0000849 A1 | 1/2008 | Zhang et al. | |
| 2008/0023240 A1 | 1/2008 | Sunsdahl et al. | |
| 2008/0023249 A1 | 1/2008 | Sunsdahl et al. | |
| 2008/0084091 A1 | 4/2008 | Nakamura et al. | |
| 2008/0093883 A1 | 4/2008 | Shibata et al. | |
| 2008/0179853 A1 | 7/2008 | Kuwabara et al. | |
| 2008/0256738 A1 | 10/2008 | Malone | |
| 2008/0308334 A1 | 12/2008 | Leonard et al. | |
| 2009/0000849 A1 | 1/2009 | Leonard et al. | |
| 2009/0071737 A1 | 3/2009 | Leonard et al. | |
| 2009/0071739 A1 | 3/2009 | Leonard et al. | |
| 2009/0091101 A1 | 4/2009 | Leonard et al. | |
| 2009/0108632 A1 | 4/2009 | Wen et al. | |
| 2009/0121518 A1 | 5/2009 | Leonard et al. | |
| 2009/0183937 A1 | 7/2009 | Yamamura et al. | |
| 2009/0183938 A1 * | 7/2009 | Cover | B60N 2/06 |
| | | | 180/291 |
| 2009/0184534 A1 | 7/2009 | Smith et al. | |
| 2009/0184536 A1 | 7/2009 | Kubota | |
| 2009/0184537 A1 | 7/2009 | Yamamura et al. | |
| 2009/0184541 A1 | 7/2009 | Yamamura et al. | |
| 2009/0200823 A1 * | 8/2009 | Vertanen | B60R 13/01 |
| | | | 296/26.08 |
| 2009/0301830 A1 * | 12/2009 | Kinsman | F16F 9/0218 |
| | | | 188/289 |
| 2009/0302590 A1 | 12/2009 | Van et al. | |
| 2010/0012412 A1 * | 1/2010 | Deckard | B62D 25/20 |
| | | | 180/90.6 |
| 2010/0155170 A1 * | 6/2010 | Melvin | F16H 57/0489 |
| | | | 180/339 |
| 2010/0194086 A1 | 8/2010 | Yamamura et al. | |
| 2010/0201156 A1 | 8/2010 | Nakamura | |
| 2010/0314184 A1 | 12/2010 | Stenberg et al. | |
| 2010/0317485 A1 * | 12/2010 | Gillingham | B60K 17/356 |
| | | | 180/242 |
| 2011/0025012 A1 | 2/2011 | Nakamura | |
| 2011/0143113 A1 | 6/2011 | Hatta et al. | |
| 2011/0155087 A1 | 6/2011 | Wenger et al. | |
| 2011/0156438 A1 | 6/2011 | Ichihara et al. | |
| 2011/0298189 A1 | 12/2011 | Schneider et al. | |
| 2012/0031693 A1 | 2/2012 | Deckard et al. | |
| 2012/0073527 A1 | 3/2012 | Oltmans et al. | |
| 2012/0073537 A1 | 3/2012 | Oltmans et al. | |
| 2012/0160589 A1 | 6/2012 | Tsumiyama et al. | |
| 2012/0212013 A1 | 8/2012 | Ripley et al. | |
| 2012/0217078 A1 | 8/2012 | Kinsman et al. | |
| 2012/0223500 A1 | 9/2012 | Kinsman et al. | |
| 2013/0033070 A1 | 2/2013 | Kinsman et al. | |
| 2013/0087397 A1 | 4/2013 | Yamamoto et al. | |
| 2013/0087398 A1 | 4/2013 | Kotani et al. | |
| 2014/0000174 A1 | 1/2014 | Minagawa et al. | |
| 2014/0049067 A1 | 2/2014 | Kasuya et al. | |
| 2014/0060954 A1 | 3/2014 | Smith et al. | |
| 2014/0062048 A1 | 3/2014 | Schlangen et al. | |
| 2014/0065936 A1 | 3/2014 | Smith et al. | |
| 2014/0067215 A1 | 3/2014 | Wetterlund et al. | |
| 2014/0109627 A1 | 4/2014 | Lee et al. | |
| 2014/0265285 A1 | 9/2014 | Erspamer | |
| 2015/0274212 A1 * | 10/2015 | Karube | B62D 25/082 |
| | | | 296/193.11 |
| 2015/0274215 A1 * | 10/2015 | Karube | B62D 25/20 |
| | | | 296/193.07 |
| 2015/0291056 A1 * | 10/2015 | Nozaki | B60K 1/04 |
| | | | 180/65.1 |
| 2015/0367891 A1 * | 12/2015 | Deschamps | B62D 21/183 |
| | | | 280/781 |
| 2016/0176449 A1 | 6/2016 | Kazakoff et al. | |
| 2018/0022391 A1 | 1/2018 | Lutz et al. | |
| 2018/0326843 A1 * | 11/2018 | Danielson | B60G 15/062 |
| 2020/0010120 A1 | 1/2020 | Kinsman et al. | |
| 2021/0269096 A1 | 9/2021 | Erspamer et al. | |

FOREIGN PATENT DOCUMENTS

| | | |
|---|---|---|
| CA | 2826756 A1 | 8/2012 |
| CA | 2901541 A1 | 9/2014 |
| CA | 2910026 A1 | 12/2014 |
| CA | 2921360 A1 | 2/2015 |
| CA | 2933980 A1 | 6/2015 |
| CN | 201276159 Y | 7/2009 |
| CN | 101511664 A | 8/2009 |
| CN | 101878146 A | 11/2010 |
| CN | 102256825 A | 11/2011 |
| DE | 0037435 | 10/1886 |
| DE | 19949787 A1 | 4/2000 |
| DE | 102008050671 A1 | 4/2010 |
| EP | 0568251 A1 | 11/1993 |
| EP | 1493624 A1 | 1/2005 |
| EP | 1600326 A1 | 11/2005 |
| EP | 1602523 A2 | 12/2005 |
| EP | 2057060 A2 | 5/2009 |
| EP | 2236395 A1 | 10/2010 |
| FR | 2914597 A1 | 10/2008 |
| FR | 2936028 A1 | 3/2010 |
| GB | 2036659 A | 7/1980 |
| GB | 2436091 A | 9/2007 |
| JP | 59-032525 A | 2/1984 |
| JP | 63-025977 | 5/1988 |
| JP | 06-325977 A | 11/1994 |
| JP | 07-040783 A | 2/1995 |
| JP | 11-091637 A | 4/1999 |
| JP | 2001-130304 A | 5/2001 |
| JP | 2003-237530 A | 8/2003 |
| JP | 2010-095106 A | 4/2010 |
| WO | 98/30430 A1 | 7/1998 |
| WO | 03/42026 A1 | 5/2003 |
| WO | 03/55716 A1 | 7/2003 |
| WO | 2008/016377 A2 | 2/2008 |
| WO | 2009/137579 A1 | 11/2009 |
| WO | 2010/148014 A1 | 12/2010 |
| WO | 2012/040553 A2 | 3/2012 |
| WO | 2012/109546 A1 | 8/2012 |
| WO | 2012/174793 A1 | 12/2012 |
| WO | 2013/166310 A1 | 11/2013 |

(56) References Cited

FOREIGN PATENT DOCUMENTS

| WO | 2014/039432 A2 | 3/2014 |
|---|---|---|
| WO | 2014/039433 A2 | 3/2014 |
| WO | 2014/059258 A1 | 4/2014 |

OTHER PUBLICATIONS

2008 Dealer Expo Top UTV Products-Rhino, Ranger and RZRs were everything at the . . . , dated Feb. 18, 2008, 6 pages.
Artic Cat, Company Website, Prowler XT650 H1, undated; 9 pages.
BRP Can-Am Commander photo, undated; 1 page.
Buyer'S Guide Supplement, 2006 Kart Guide, Powersports Business Magazine; 6 pages.
Club Car, Company Website, product pages for XRT 1500 SE, undated; 2 pages.
Communication Pursuant to Article 34(3) EPC issued by the European Patent Office, dated Oct. 30, 2018, for European Patent Application 14726795.9; 8 pages.
European Search Report and Search Opinion Received for EP Application No. 17150711.4, dated Jun. 7, 2017, 7 pages.
Examination Report issued by Intellectual Property India, dated Mar. 12, 2019, for Indian Patent Application No. 7003/DELNP/2013; 7 pages.
Examination Report No. 1 issued by the Australian Government IP Australia, dated Nov. 29, 2018, for Australian Patent Application No. 2018204263; 4 pages.
Honda Hippo 1800 New Competition for Yamaha's Rhino, Dirt Wheels Magazine, Apr. 2006; pp. 91-92.
International Preliminary Report on Patentability issued by the European Patent Office, dated Jul. 6, 2015, for International Patent Application No. PCT/US2014/039824; 12 pages.
International Preliminary Report on Patentability issued by the European Patent Office, dated Mar. 8, 2013, for International PCT Application No. PCT/US2012/024664; 24 pages.
International Preliminary Report on Patentability issued by the European Patent Office, dated Sep. 2, 2009, for related International Patent Application No. PCT/US2010/038709, 45 pages.
International Preliminary Report on Patentability issued by the European Patent Office, dated Jun. 11, 2015, for International Patent Application No. PCT/US2014/028152; 35 pages.
International Preliminary Report on Patentablility issued by the European Patent Office, dated Nov. 4, 2014, for International PCT Application No. PCT/US2013/039304; 7 pages.
International Search Report and Written Opinion issued by the European Patent Office, dated Jul. 25, 2014, for related International Application No. PCT/US2014/028152; 21 pages.
International Search Report and Written Opinion issued by the European Patent Office, dated Jul. 23, 2013, for International PCT Application No. PCT/US2013/039304; 11 pages.
International Search Report and Written Opinion issued by the European Patent Office, dated Jun. 28, 2012, for International PCT Application No. PCT/US2012/024664; 19 pages.
International Search Report and Written Opinion issued by the European Patent Office, dated Sep. 9, 2014, for related International Application No. PCT/US2014/039824; 10 pages.
International Search Report issued by the European Patent Office, dated Sep. 14, 2010, for related International Application No. PCT/2010/038709, 5 pages.
Kawasaki Mule the Off-Road Capable 610 4×4 Brochure 2011, (Copyrights) 2010; 6 pages.
Kawasaki Mule Utility Vehicle Brochure 2009, (Copyrights) 2008; 10 pages.
Kawasaki Teryx 750 FL 4×4 Sport Brochure 2011, (Copyrights) 2010; 6 pages.
Kawasaki Teryx Recreation Utility Vehicle Brochure 2009, (Copyrights) 2008; 8 pages.
Office Action issued by the Canadian Intellectual Property Office, dated Jun. 15, 2020, for Canadian Patent Application No. 2,901,541; 6 pages.
Office Action issued by the Canadian Intellectual Property Office, dated Oct. 16, 2019, for Canadian Patent Application No. 2,901,541; 7 pages.
Office Action issued by the Canadian Patent Office, dated Mar. 22, 2018, for related Canadian Patent Application No. 2,870,867, 6 pages.
Office Action issued by the European Patent Office, dated Jun. 15, 2018, for related European Patent Application No. 17150711.4; 4 pages.
Office Action dated Sep. 18, 2020, for Mexican Patent Application No. MX/a/2016/000762; 5 pages.
Office Action received for European Application No. 13722652.8, dated May 11, 2016, 4 pages.
Office Action received for European Application No. 14726795.9, dated Mar. 9, 2018, 6 pages.
Pictures of Vehicle publicly disclosed in Jul. 2008, 3 pages.
Polaris Industries, Ranger Catalog, 2007, 28 pages.
Polaris Industries, Ranger RZR Catalog, 2008, 12 pages.
Polaris Ranger Brochure 2009, (Copyrights) 2008; 32 pages.
Polaris Ranger Brochure 2011, (Copyright) 2010, 22 pages.
Polaris Ranger Brochure ATVs and Side × Sides Brochure 2010, (Copyrights) 2009; 26 pages.
Polaris Ranger Off-Road Utility Vehicles Brochure 2004, (Copyrights) 2003; 20 pages.
Polaris Ranger RZR Brochure 2011, (Copyrights) 2010; 16 pages.
Polaris Ranger Welcome to Ranger Country Brochure 2006, (Copyrights) 2005; 24 pages.
Polaris Ranger Work/Play Only Brochure 2008, (Copyrights) 2007; 28 pages.
Ray Sedorchuk, New for 2004, Yamaha Rhino 660 4×4, ATV Connection Magazine, (Copyrights) 2006; 3 pages.
Robby Gordon's RZR-S 4 seater-Yamaha Rhino Forum-Rhino Forums.net, dated Nov. 11, 2009, 14 pages.
Side by Side Sports.com, Polaris Ranger Rear Cage Extension and Seat Set, available at www.sidebysidesports.com/porarecaexan.html, last accessed on Mar. 29, 2011.
Tellico 4×4.com, Polaris Ranger Accessories and Ranger Parts for Crew 500, 700, 800, XP, available at www.tellico4x4.com/index.php/cPath/3523, last accessed on Mar. 29, 2011.
Written Opinion of the International Search Authority issued by the European Patent Office, dated Sep. 14, 2009, for related International Application No. PCT/US2010/038709, 6 pages.
Yamaha Company Website, 2006 Rhino 450 Auto 4×4, copyright 2006; 4 pages.
Yamaha, Company Website, 2006 Rhino 450 Auto 4×4, (Copyrights) 2005; 3 pages.
Yamaha, Company Website, Rhino 660 Auto 4×4 Exploring Edition Specifications, (Copyrights) 2006; 3 pages.
Office Action issued by the Canadian Intellectual Property Office, dated Oct. 5, 2023, for Canadian Patent Application No. 3,167,426; 6 pages.

\* cited by examiner

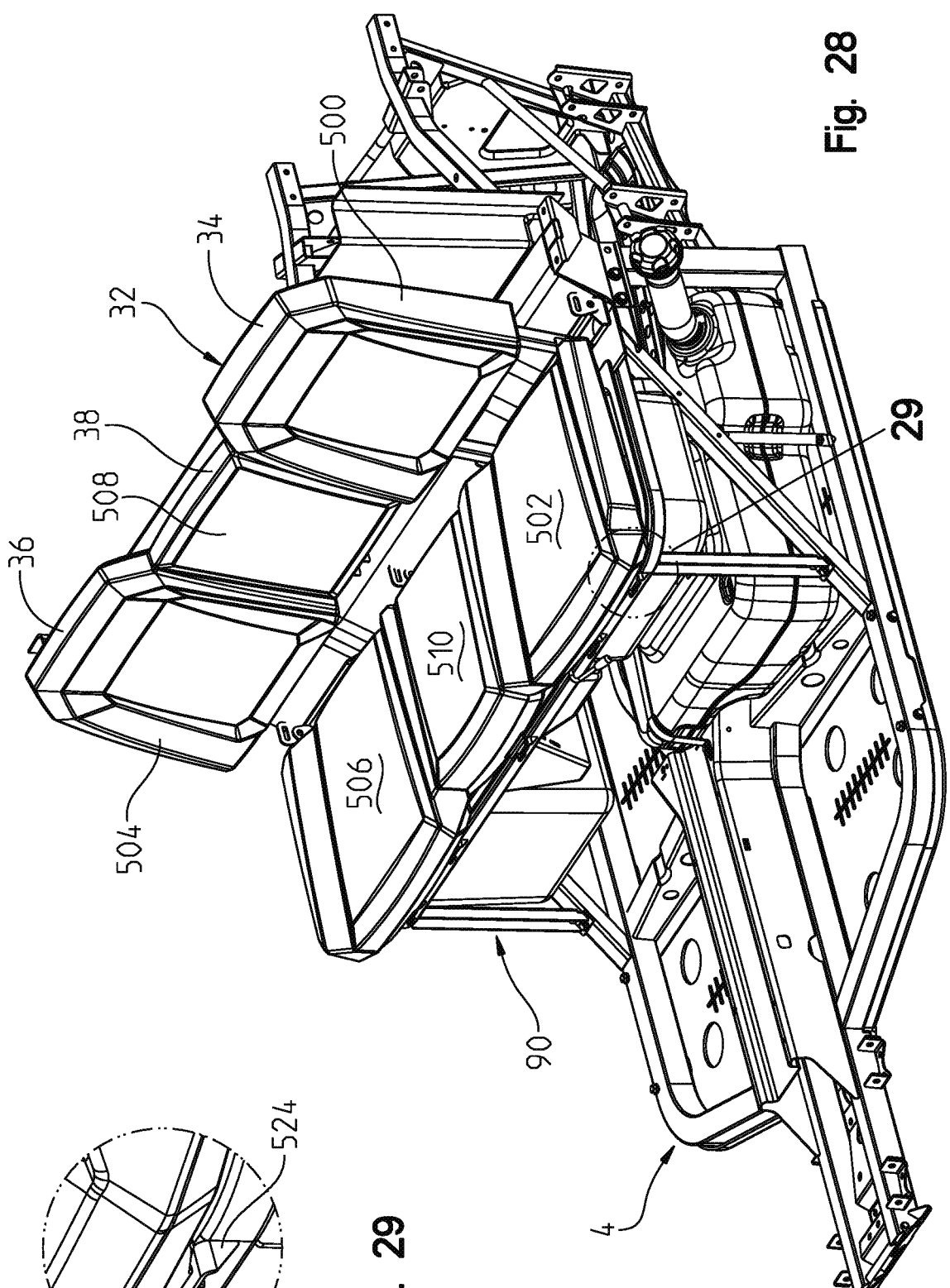
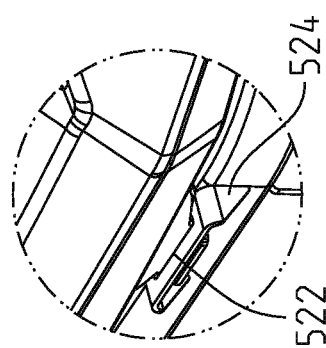
Fig. 28
Fig. 29

SIDE-BY-SIDE ALL TERRAIN VEHICLE

The present application is a continuation of U.S. patent application Ser. No. 16/576,962, filed on Sep. 20, 2019, which is a continuation of U.S. patent application Ser. No. 15/494,296, filed on Apr. 21, 2017, which is a continuation of U.S. patent application Ser. No. 13/370,139, filed on Feb. 9, 2012, which claims priority to U.S. Provisional Patent Application Ser. No. 61/442,071, filed on Feb. 11, 2011, the subject matter of which are incorporated herein by reference.

SUMMARY

The subject disclosure is generally related to side by side all terrain vehicles.

Generally, all terrain vehicles ("ATVs") and utility vehicles ("UVs") are used to carry one or two passengers and a small amount of cargo over a variety of terrains. Due to increasing recreational interest in side by side vehicles, such as those used for trail riding, recreational use, and cargo hauling have entered the market place.

Most side by side vehicles include seating for two to three passengers. Side-by-side vehicles, in which the driver and passenger are seated beside each other on laterally spaced apart seats, have become popular because of the ability to allow the passenger to share the driver's viewpoint and riding experience instead of being positioned behind the driver. Two styles of vehicle are known in the marketplace; a first sportive version is known where the driver sits low in the vehicle, and one such vehicle is shown in U.S. Pat. No. 7,819,220 (and counterpart EP2057060), the subject matter of which is incorporated herein by reference. The second version has the driver seated higher in the vehicle, and one such vehicle is shown in US patent application publication number 20090301830, the subject matter of which is incorporated herein by reference.

In one embodiment described herein, a side by side vehicle is disclosed having a vehicle frame having frame tubes extending from a front to a rear. A vehicle seat frame is positioned in a mid portion of the frame, and positions a seat frame at a raised position relative to the frame tubes. A powertrain is positioned rearward of the vehicle seat frame and is coupled to the vehicle frame. Side by seats are supported by the seat frame; and one or more storage units are positioned under the side by side seats.

In another embodiment, a side by side vehicle comprises a vehicle frame having frame tubes extending from a front to a rear. A vehicle seat frame is positioned in a mid portion of the frame, and positions a seat frame at a raised position relative to the frame tubes. A powertrain is positioned rearward of the vehicle seat frame and is coupled to the vehicle frame. Side by side seats are supported by the seat frame. A rear suspension comprising at least one rear alignment arm is coupled to each side of a rear of the vehicle frame, where the alignment arms are coupled to the vehicle frame at front and rear connection points. A distance between the front connection points is greater than a distance between the rear connection points, and at least a portion of the powertrain is positioned between the front connection points of the alignment arms.

In another embodiment, a side by side vehicle comprises a vehicle frame, a vehicle seat frame positioned in a mid portion of the frame, and positioned at a raised position relative to the frame tubes. A powertrain is positioned rearward of the vehicle seat frame and is coupled to the vehicle frame. Side by side seats are supported by the seat frame and one or more storage units positioned under the side by side seats. A rear suspension has at least one first connection point to the frame, wherein at least a portion of the powertrain is positioned rearward of the first connection point.

In another embodiment, a side by side vehicle comprises a vehicle frame; and a vehicle seat frame positioned in a mid portion of the frame, with the seat frame at a raised position relative to the frame tubes. Side by side seats are supported by the seat frame. A powertrain is positioned rearward of the vehicle seat frame and is supported by the vehicle frame. At least one storage unit is positioned under the side by side seats; and the storage bin houses an electronic assembly of the vehicle.

In yet another embodiment, a side by side vehicle comprises a vehicle frame, side by side seats supported by the frame, a powertrain supported by the vehicle frame; a cargo storage device supported by the frame, the storage area device having apertures extending therethrough; and tie down members extending through the apertures to an upper side of the cargo storage device, and coupled to an opposite side.

The embodiments will now be described by way of the drawings, where:

BRIEF DESCRIPTION OF THE DRAWINGS

FIG. 28 is a left front perspective view of the seating assembly of the present vehicle as assembled to the frame;

FIG. 29 is an enlarged view of the portion denoted in FIG. 28;

DETAILED DESCRIPTION OF THE EMBODIMENTS

Figure 1:
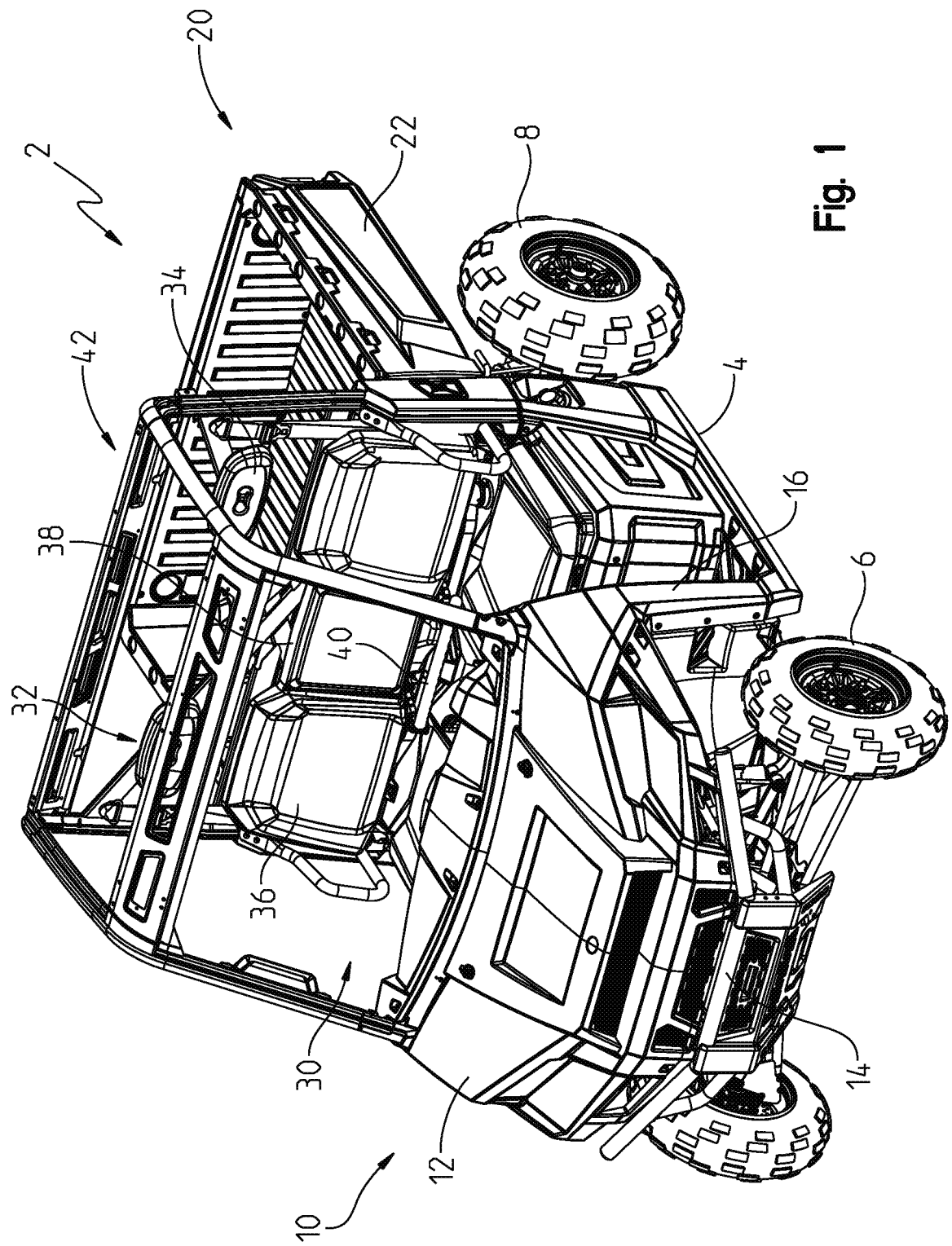
FIG. 1 is a front left perspective view of the vehicle of the present disclosure.

With reference to FIG. 1, the utility vehicle is shown generally at 2 to include a frame 4 supported by front wheels 6 and rear wheels 8. Utility vehicle 2 includes a front end 10 having a hood 12, bumper 14 and side body panel 16. Utility vehicle 2 also includes a rear end 20 having a utility cargo box 22 as described further herein. Utility vehicle 2 also includes an operator area at 30 comprising a bench seat assembly 32 having a driver's seat 34, a passenger seat 36 and a center passenger seat at 38. Operator controls such as a steering wheel is provided at 40. A roll cage 42 surrounds the entire operator area 30.

Figure 2:
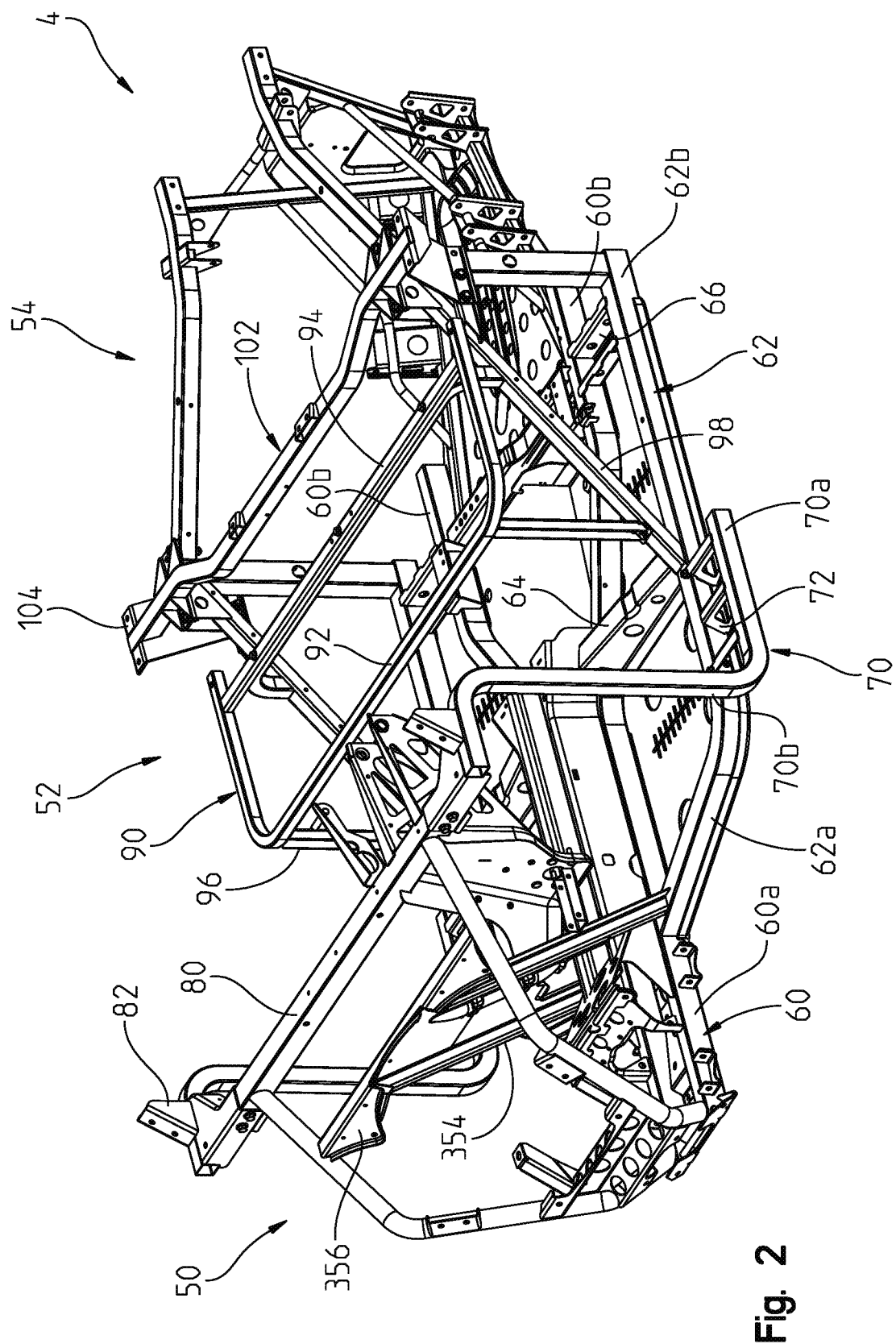
FIG. 2 is a front left perspective view of the frame of the present vehicle.
Figure 3:
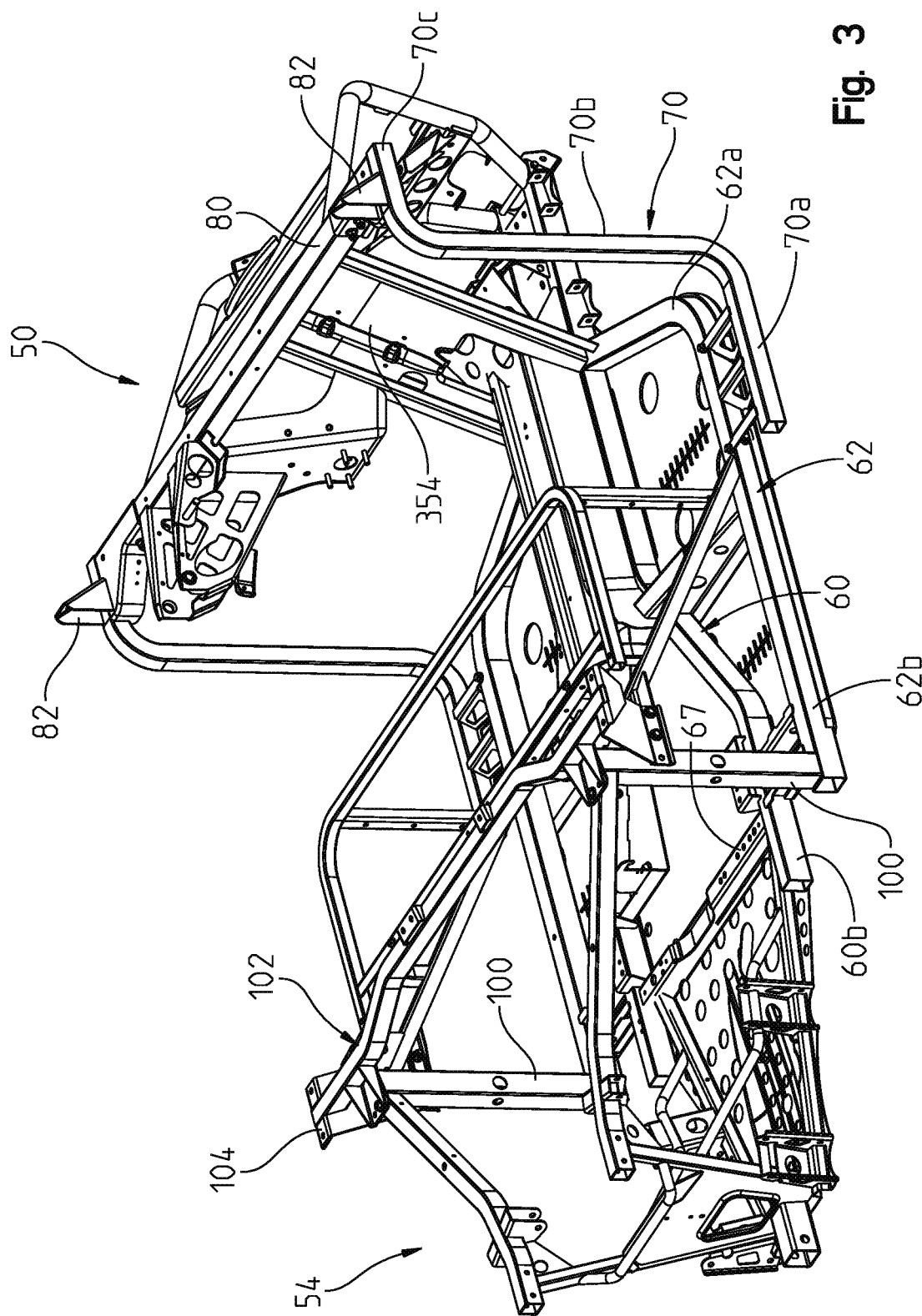
FIG. 3 is a right rear perspective view of the vehicle of the present disclosure.

With reference now to FIGS. 2 through 6, the frame will be described in greater detail. With reference first to FIG. 2, frame 4 generally includes a frame front portion 50, a frame mid portion 52 and a frame rear portion at 54. Central frame tubes 60 extend generally lengthwise between the front frame portion 50 and the rear frame portion 54 having a front portion at 60a and a flared out portion towards the rear at 60b. An outer frame tube member is provided at 62 which is connected to frame tube portion 60a; by tube portion 62a adjacent a front, and spaced apart from frame tube 60b by frame tube portion 62b. A cross tube such as 64 integrates the frame tubes 60 and 62 towards a center of the vehicle and frame channels 66 and 67 (FIG. 3) integrate the frame tubes 60 and 62 adjacent a rear of the vehicle.

A removable frame portion 70 is attached to frame tube 62 by way of brackets 72, as further described herein. As shown best in FIG. 7, removable frame portion 70 has a lower frame portion 70a, a vertically upstanding portion at 70b and an upper horizontally extending portion 70c. Removable frame portion 70 further includes gussets at 82 as described herein. A transverse brace 80 extends between the two portions 70c. Frame 4 further includes a seat frame portion at 90 having transversely extending frame tubes at 92 and 94 supported by upstanding braces 96 and diagonal braces 98. As shown best in FIG. 3, support posts 100 upstand from frame tubes 62 and support a transverse beam 102. Transverse beam 102 is removable from post 100 and also includes an upper mounting area or flange at 104, as further described herein.

Figure 4:
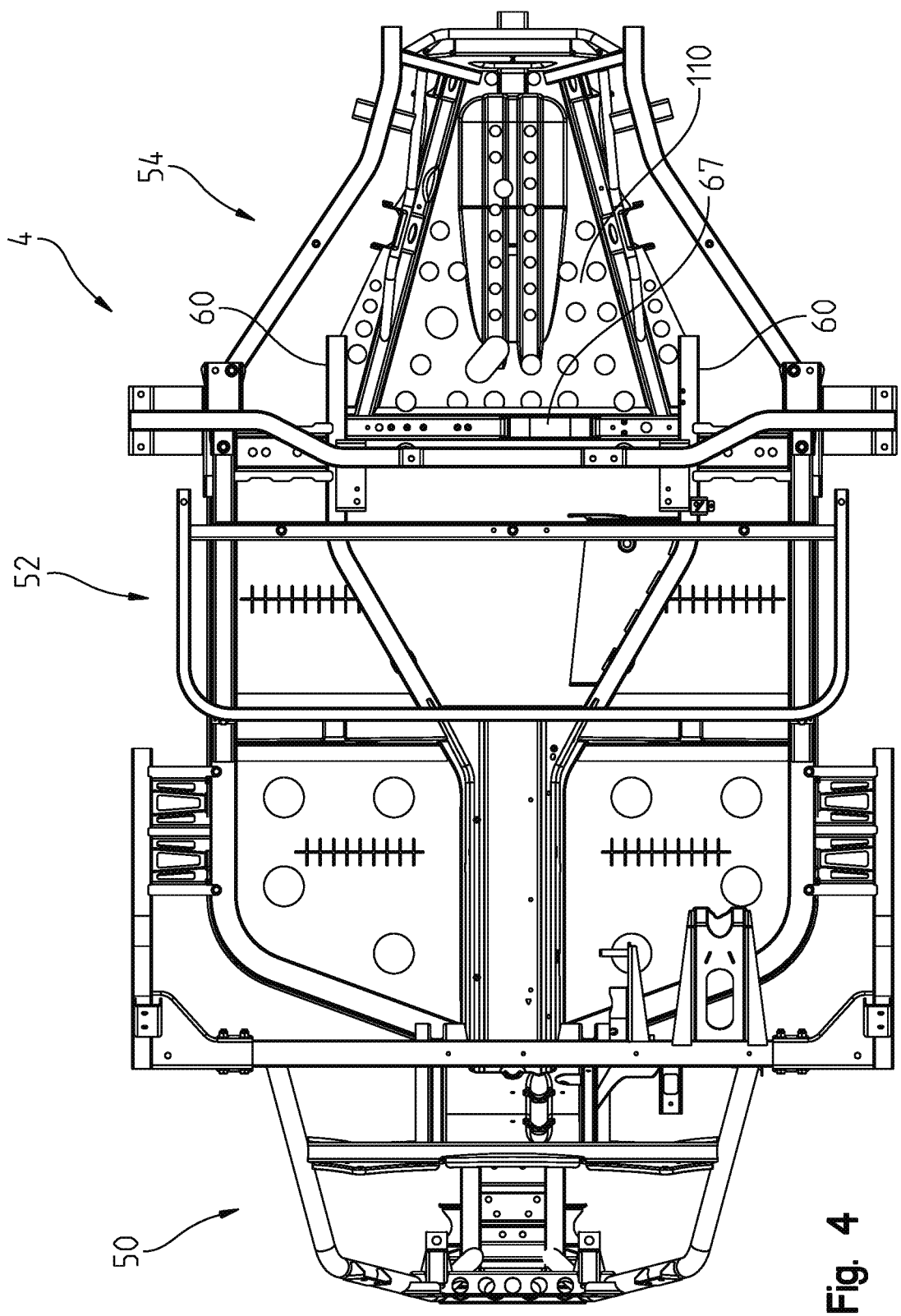
FIG. 4 is a plan view of the frame of FIGS. 2-3.
Figure 5:
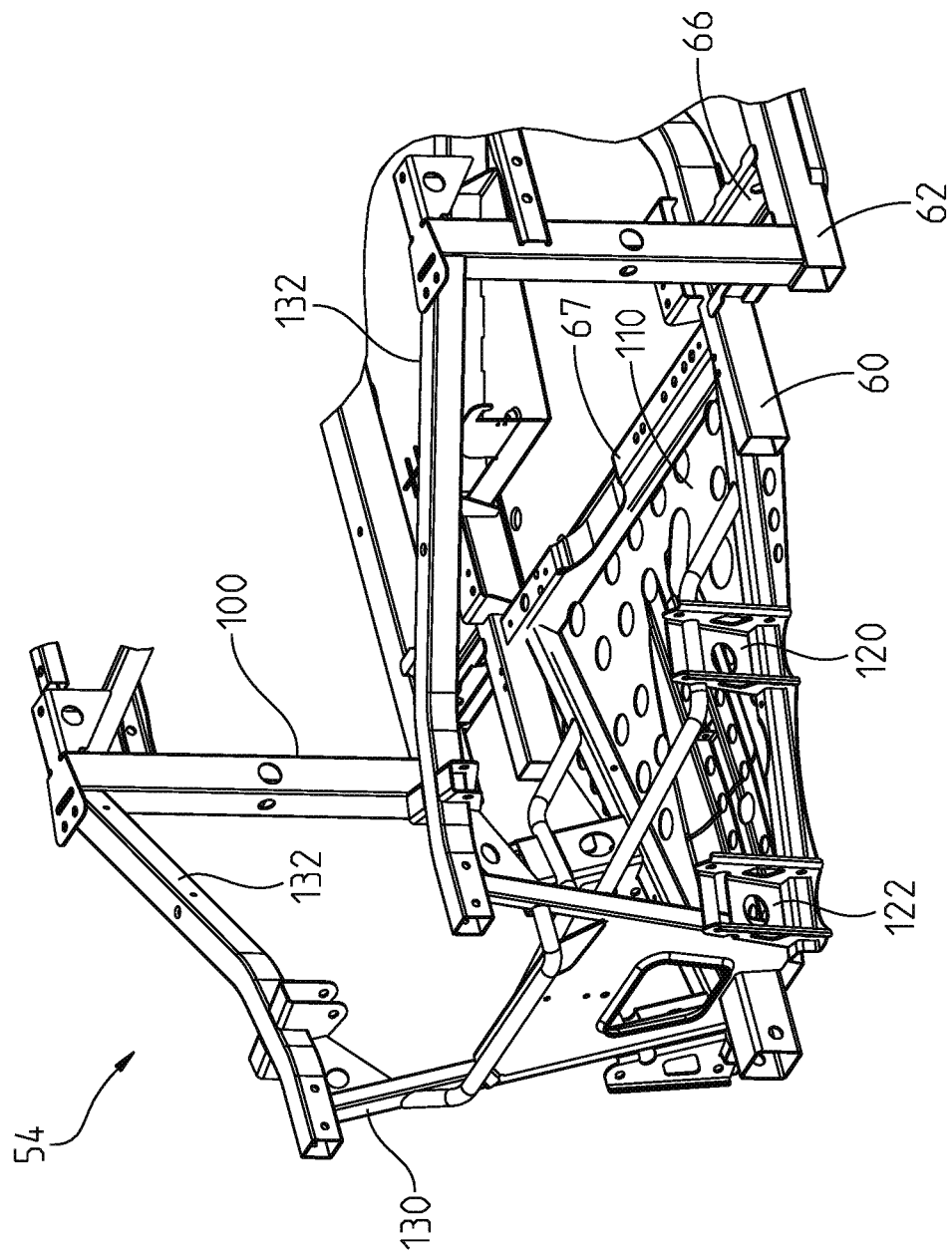
FIG. 5 is a partial rear perspective view of the frame of the present disclosure.
Figure 6:
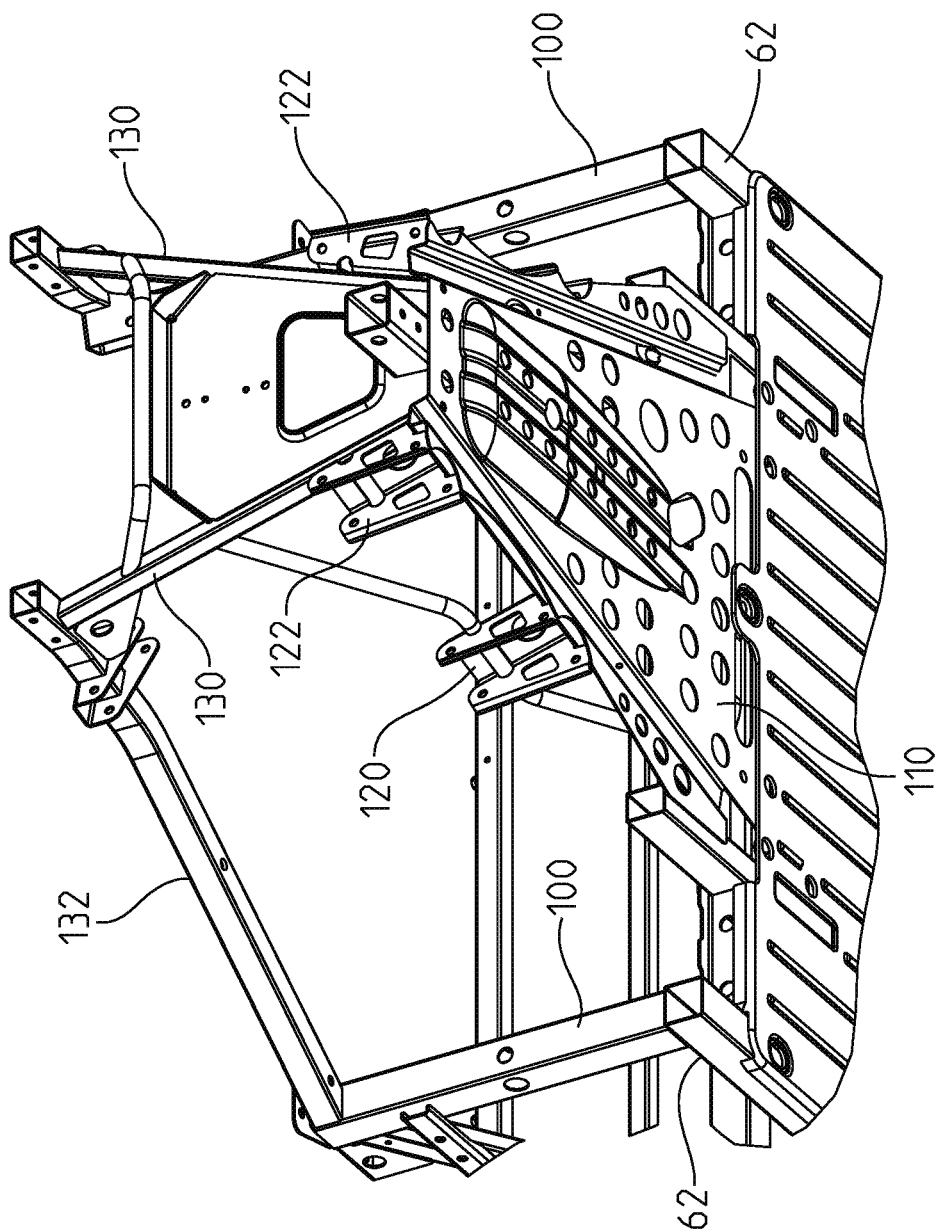
FIG. 6 is an underside perspective view of the frame of FIG. 5.

With respect now to FIGS. 4-6, a rear engine pan 110 is provided extending from channel 67 and frame tubes 60. Pan 110 defines the support platform for the drivetrain of the vehicle as will be described herein. Vertically extending channels 120, 122 (FIGS. 5, 6) extend from each side of the pan 10 and define locations for mounting alignment arms (A-arms) as described herein. Vertically extending tubes 130 extend upwardly from pan 110 and support upper frame arms 132.

Figure 7:
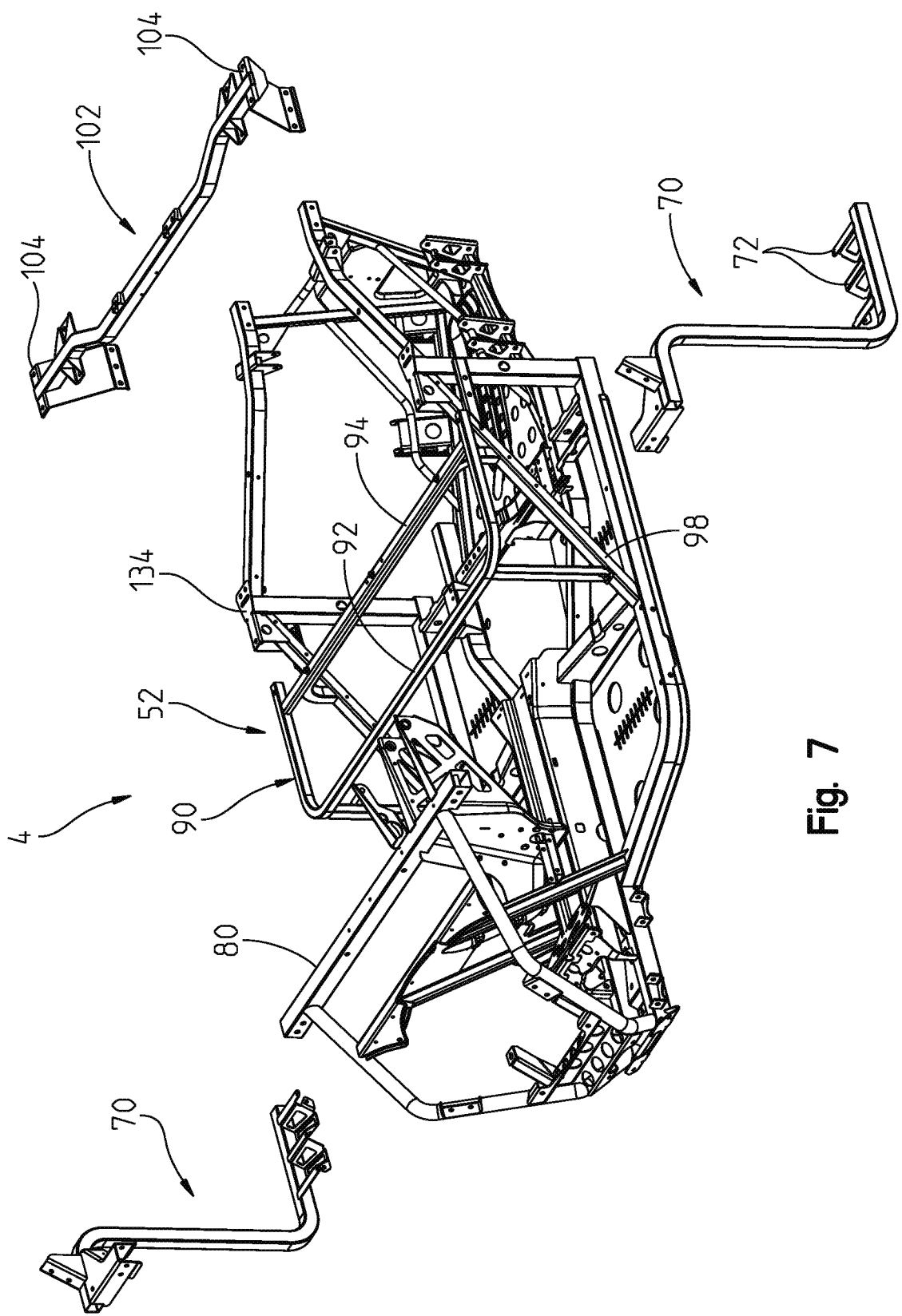
FIG. 7 is a perspective view showing removable frame components of the frame exploded away from the vehicle frame.
Figure 8:
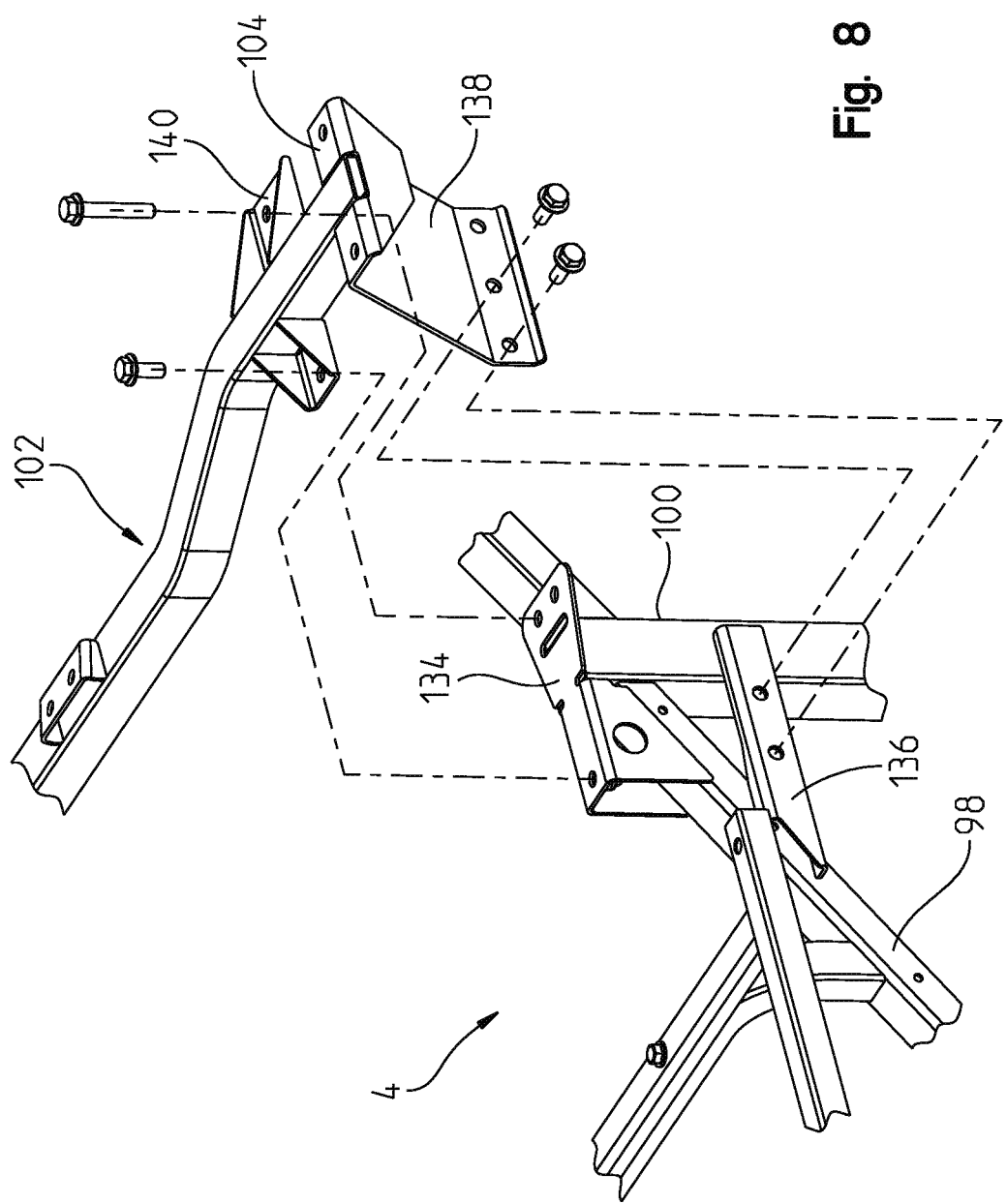
FIG. 8 shows a detailed view of a portion of the removable component.
Figure 9:
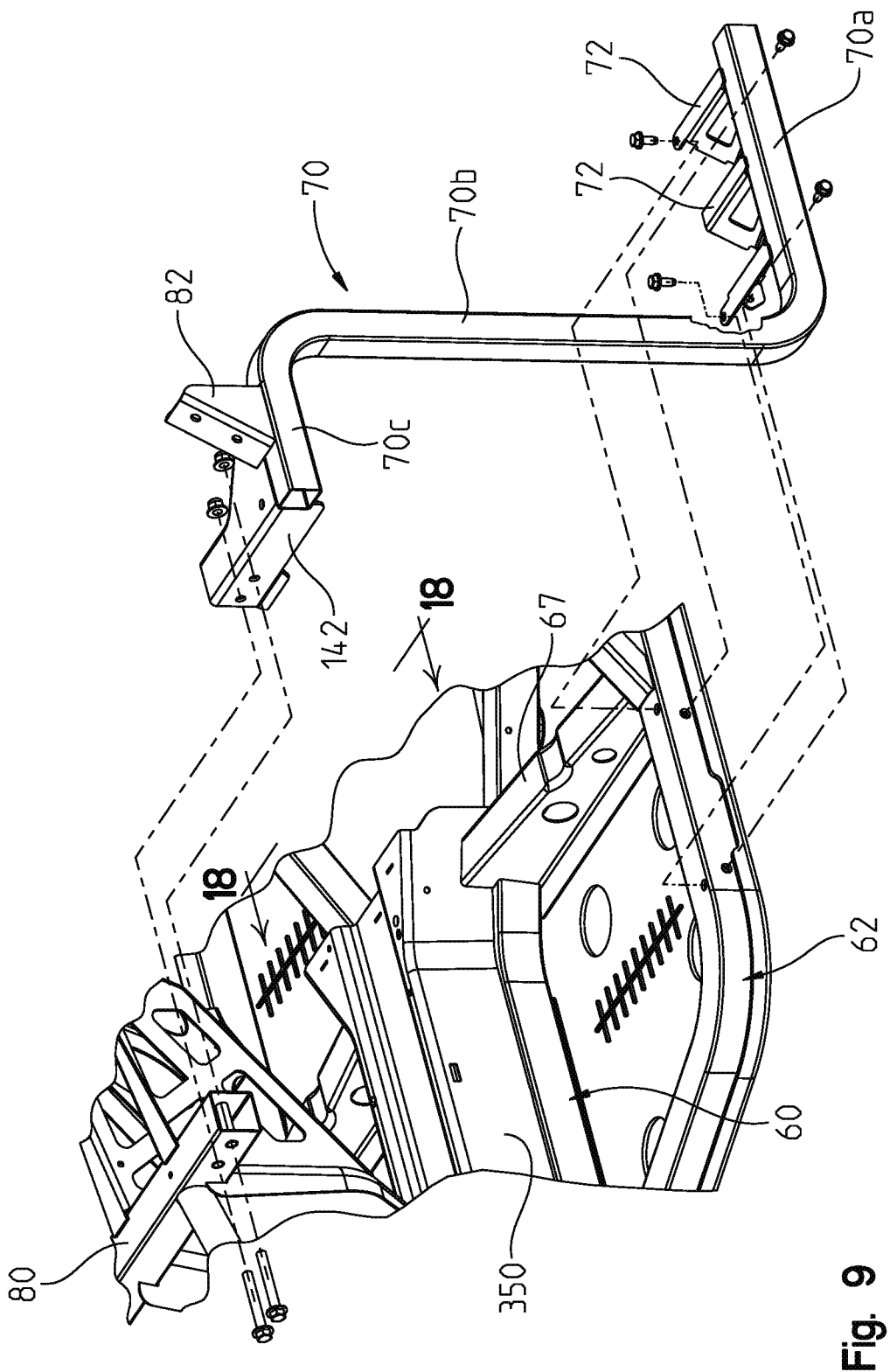
FIG. 9 shows another portion of a removable component.

With respect now to FIGS. 7 and 8, frame 4 further includes an upper mounting flange 134 attached to diagonal tube 98 and a side tube 136 (FIG. 8) extending between diagonal tube 98 and post 100. As shown in FIG. 8, transverse beam 102 is provided with a bracket 138 and a flange 140, where flange 140 attaches to flange 134 and where bracket 138 attaches to side tube 136 by way of fasteners as shown. As shown in FIG. 9, removable frame portion 70 includes a bracket 142 attached to horizontally extending portion 70c which is removably attached to transverse brace 80 by way of fasteners as shown. Lower frame portion 70a is also attached to frame tube 62 by way of fasteners through brackets 72 as shown.

Figure 10A:
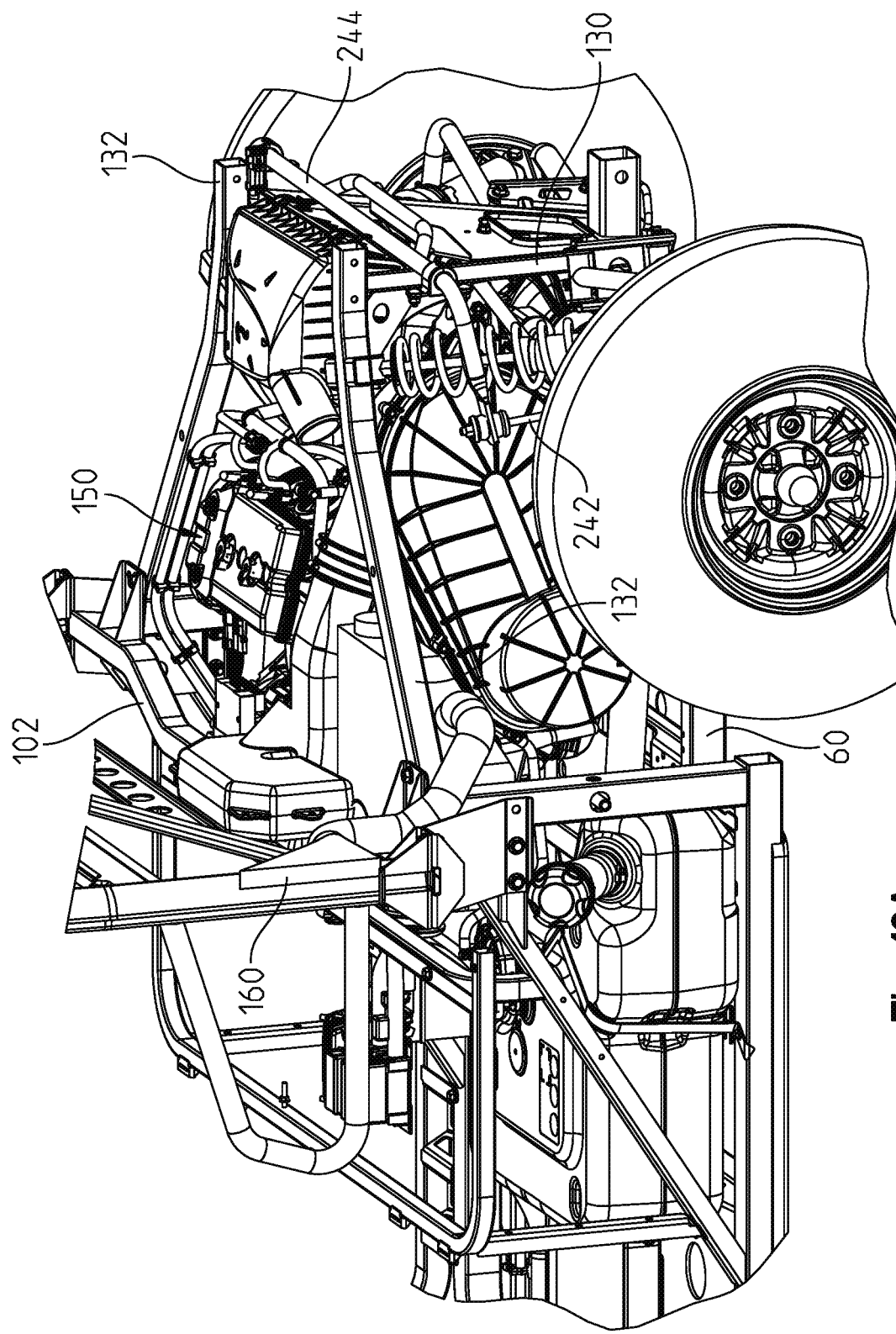
FIG. 10A shows a rear perspective view showing the engine and the transmission positioned in the frame of the present disclosure.
Figure 10B:
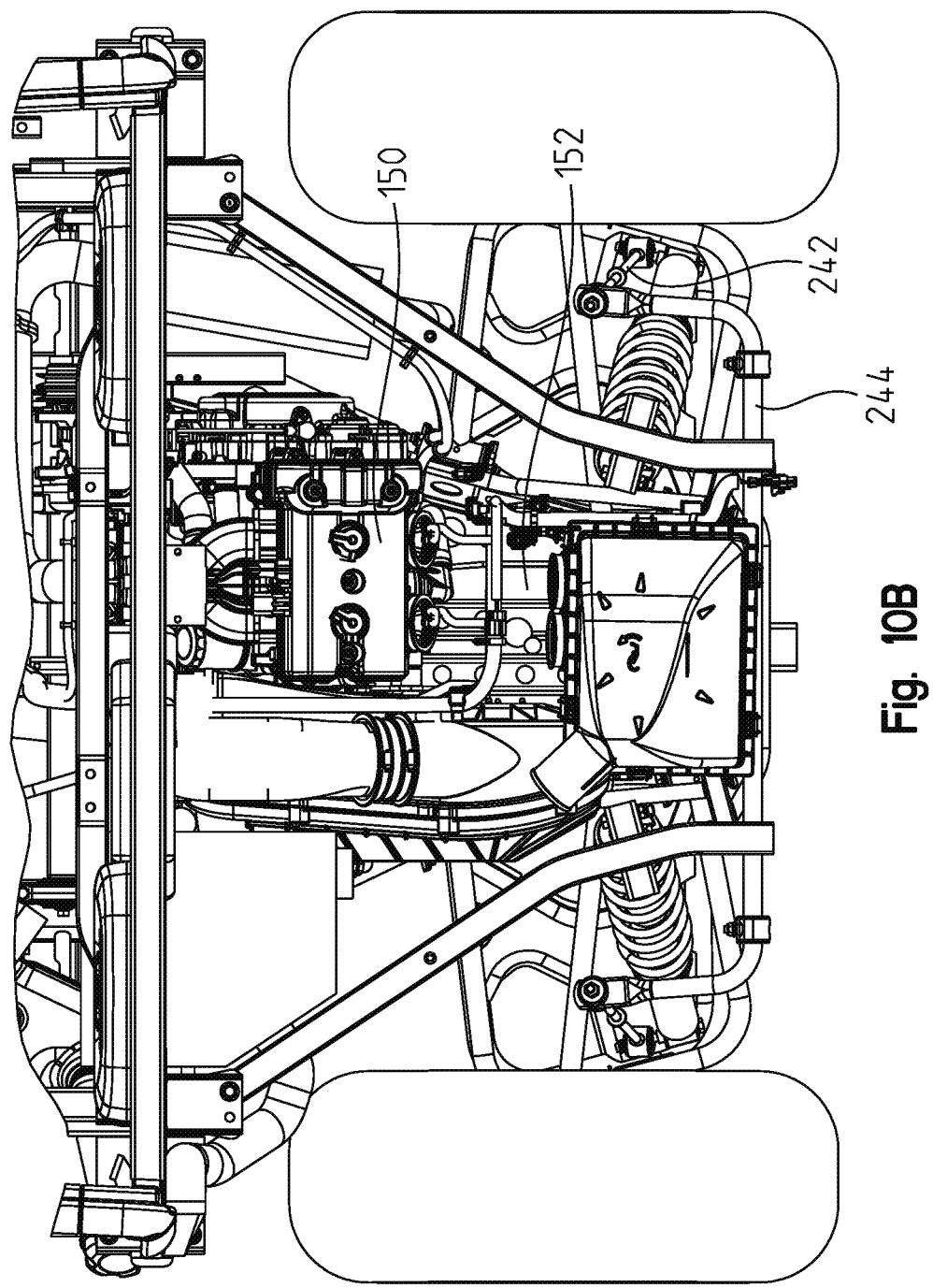
FIG. 10B shows a top plan view showing the engine and the transmission positioned in the frame of the present disclosure.
Figure 11:
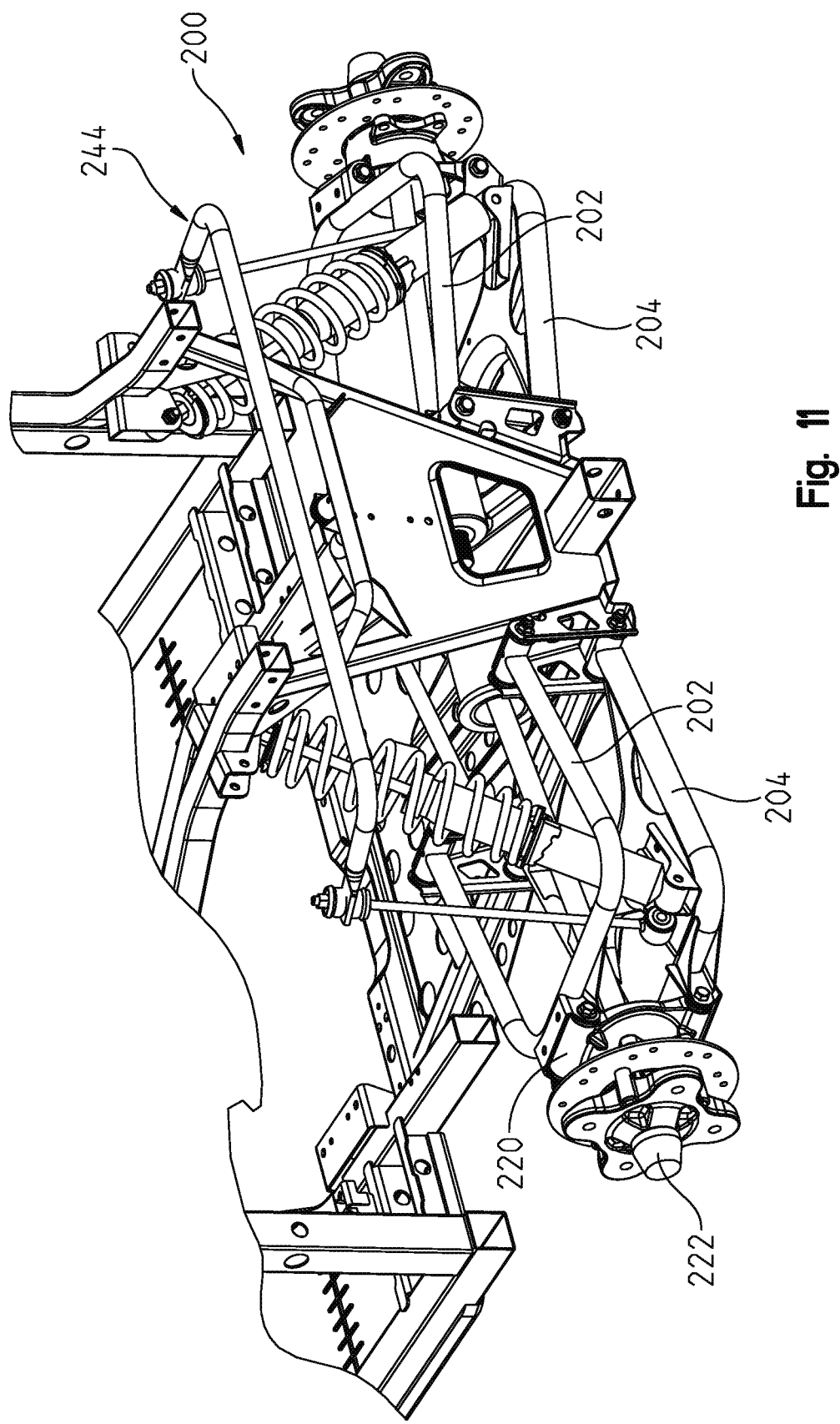
FIG. 11 shows a rear perspective view of the rear suspension.

With reference now to FIGS. 10A and 10B, engine 150 is shown mounted on pan 110 together with transmission 152. It should be noted that engine 150 is of the type shown and described in assignee's Ser. No. 61/385,802 filed Sep. 23, 2010, and corresponding PCT application PCT/US2011/52914; the subject matter of which are incorporated herein by reference. Transmission 152, the mounting of the engine 150 and transmission 152 together, as well as the mounting of the engine 150 and the transmission 152 to frame 4, is similar to that shown in either of U.S. patent application Ser. No. 12/849,480 or 12/849,516, both of which were filed on Aug. 3, 2010, and corresponding PCT application PCT/US2011/46395; the subject matter of which are incorporated herein by reference.

As shown, an air intake 160 is shown which would be mounted to a cover which surrounds the roll cage 50.

Figure 12:
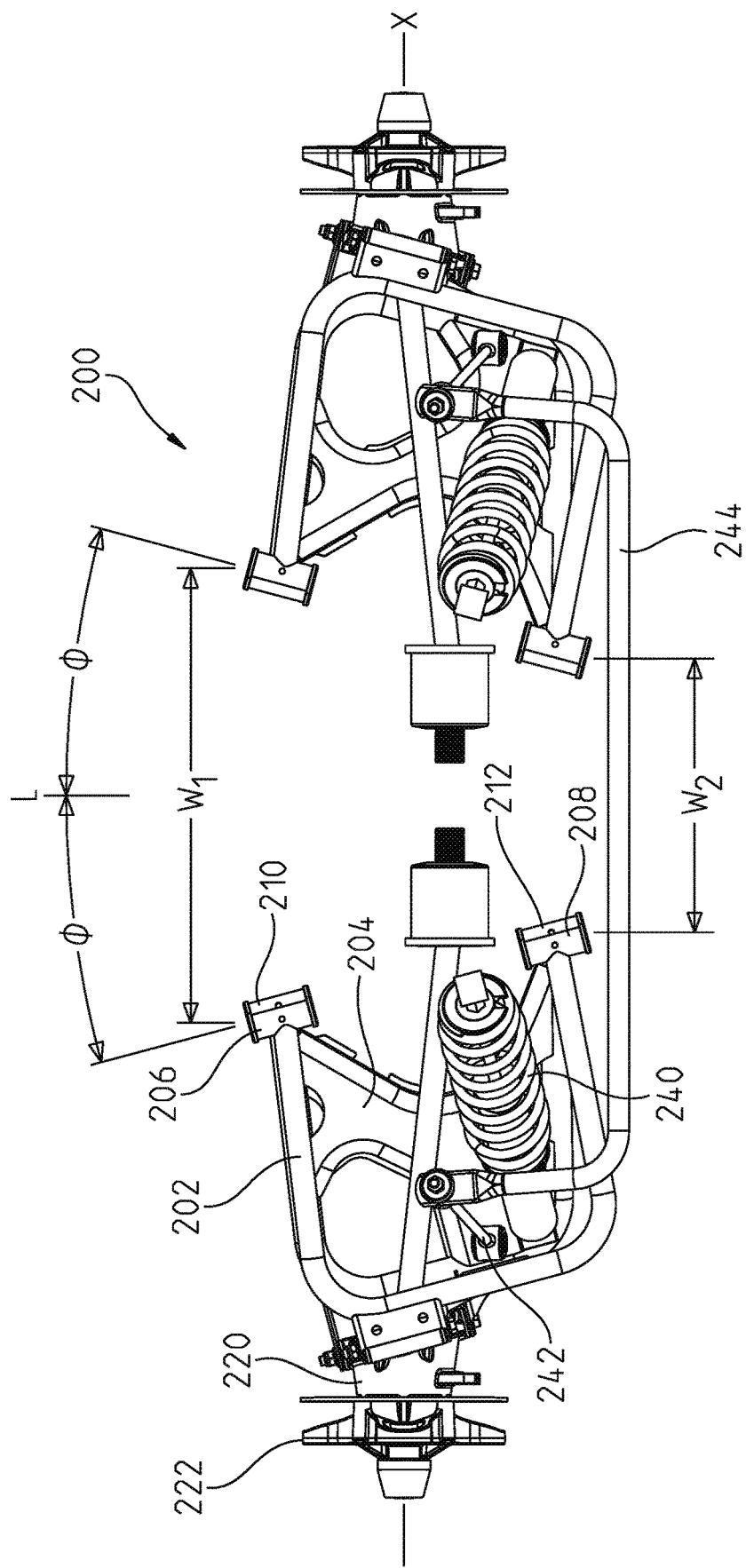
FIG. 12 shows a top view of the A-arms of the present disclosure.
Figure 13:
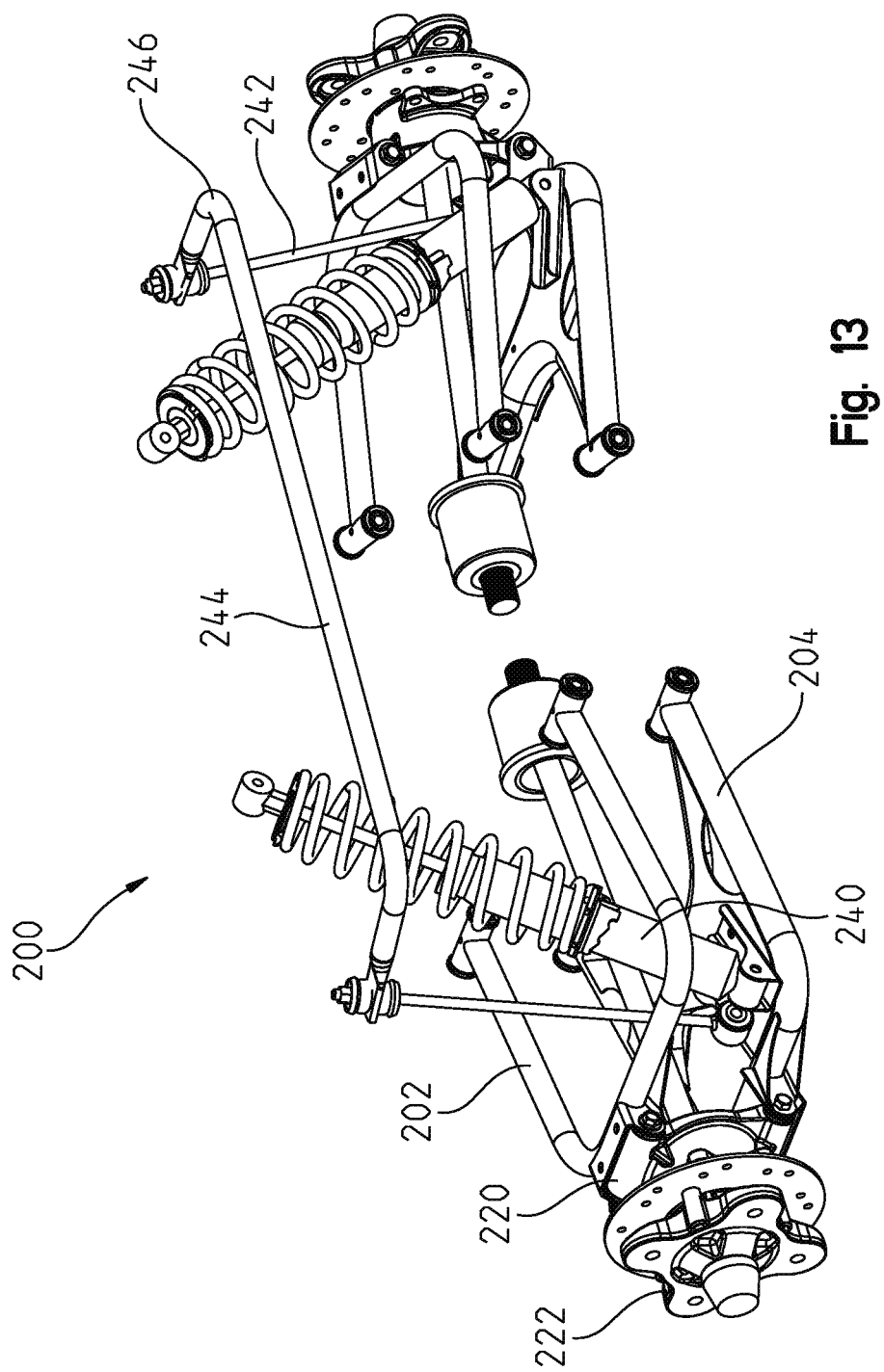
FIG. 13 shows a rear perspective view of the suspension assembly.

A re-designed suspension is shown generally as 200 in FIGS. 11-14. The suspension is re-designed to provide a space for the engine and transmission 150, 152 when the engine and transmission is mounted rearward of the seats as shown herein. More particularly, the rear suspension is provided by upper alignment arms 202 and lower alignment arms 204 whereby forward connections 206 of upper alignment arms 204 are spaced apart by a greater distance than their respective rearward connections 208; that is $W_1 > W_2$ (FIG. 12). This provides a lateral distance or width $W_1$ between the alignment arms which can receive the transmission, or at least a portion of the powertrain, there between. In a like manner, lower alignment arms 204 have forward connections 210 spaced apart at a greater distance than lower connections 212.

Figure 14:
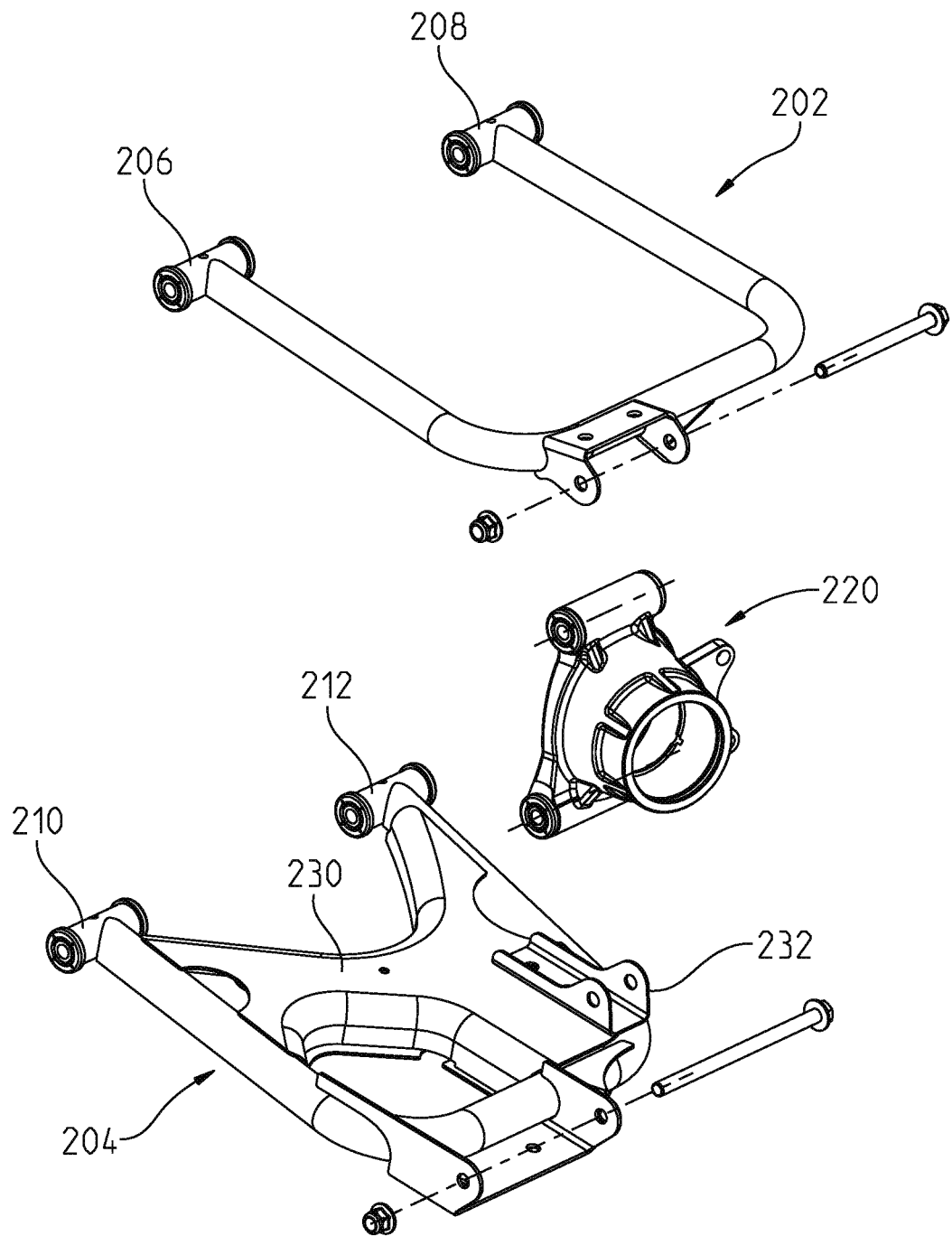
FIG. 14 shows an exploded view of a portion of the suspension of the present disclosure.

As shown, both upper and lower alignment arms 202, 204 are rectangular in configuration, and connect to a hub 220 at a forward and outer corner of the alignment arms. As shown in FIG. 12, the alignment arms extend at oblique angles Ø relative to a longitudinal axis L, and each of the hubs 220 includes a spindle 222 which rotates along an axis X transverse to the longitudinal axis L. As shown in FIG. 14, lower alignment arms 204 further comprise a lower plate portion 230 which provides a bracket 232 for both a shock absorber 240 and a mounting arm 242 of torsion bar 244. Torsion bar 244 is shown in FIGS. 10-13 rotationally mounted to upright 130, and with torsion bar arms 246 extending forwardly. The location of the hubs 220 provides room for the shock absorbers 240 and mounting arm 242 of the torsion bar 244, as best shown in FIG. 12.

Figure 15:
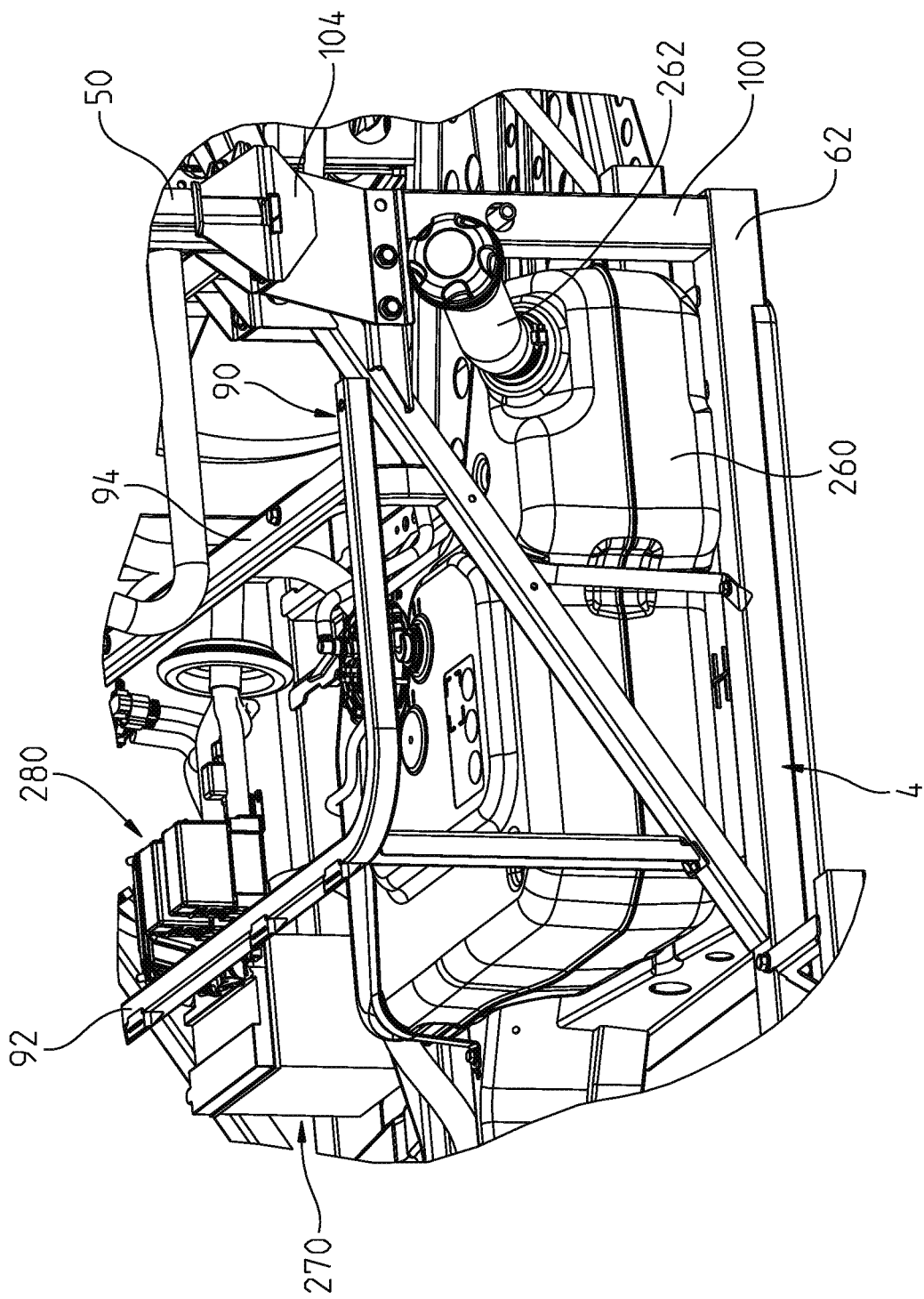
FIG. 15 shows components positioned under the seat frame of the present disclosure.

With reference now to FIG. 15, due to the location of the engine rearward of the seat 32, the area beneath the seat frame 90 is now available for other system components. As shown, fuel tank 260 is shown positioned below the seat frame 90 with a filler tube 262 extending out from the driver's side and beyond the frame formed by frame tube 62 and post 100. Battery 270 is shown positioned below a passenger side of the seat frame 90. Meanwhile an electronic assembly 280 is positioned below the center seat of frame 90, and the electronic assembly may comprise an engine control unit, a vehicle control unit, relays and the like.

Figure 16:
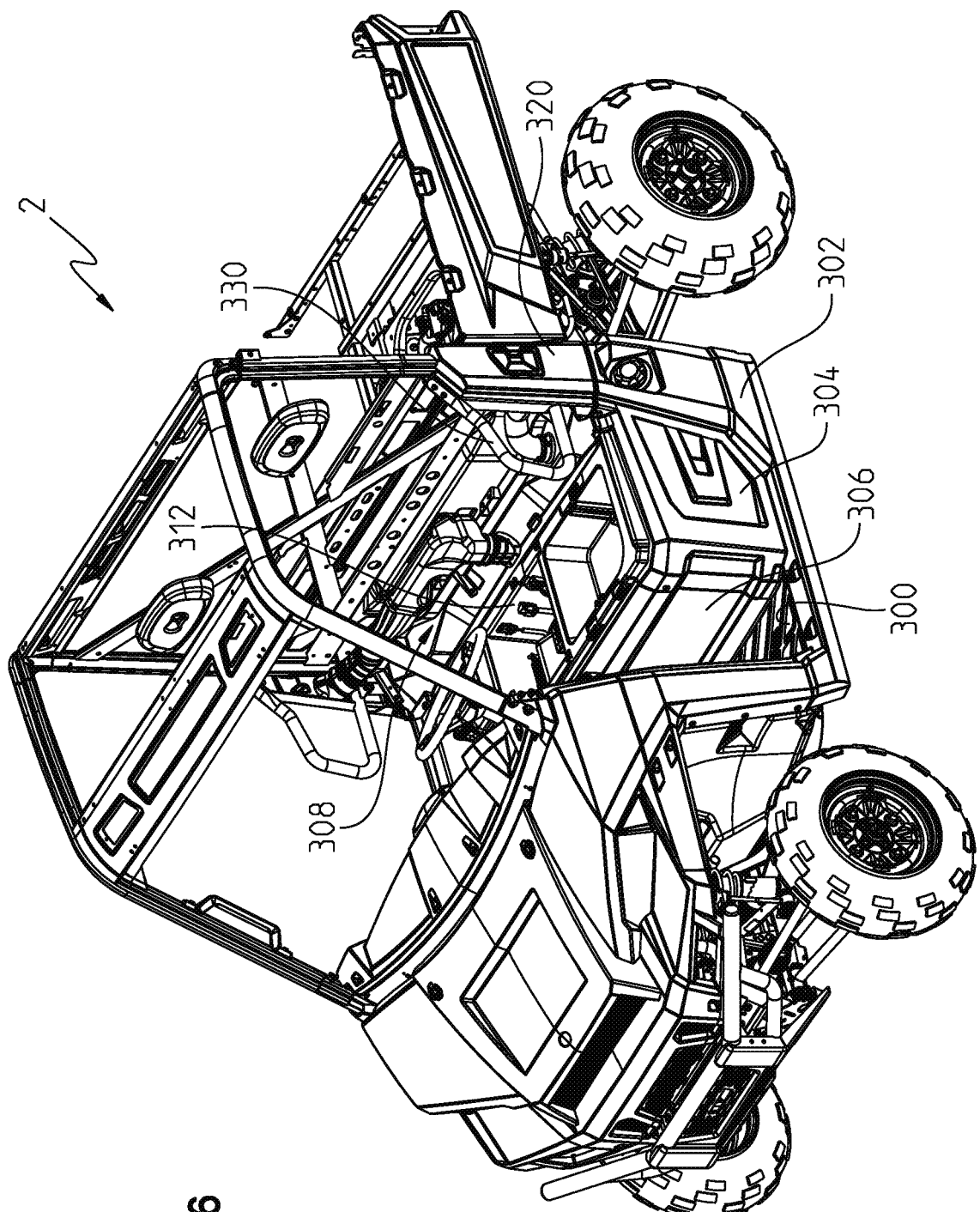
FIG. 16 shows a partially assembled vehicle showing chassis components positioned over the vehicle's seat frame.
Figure 17:
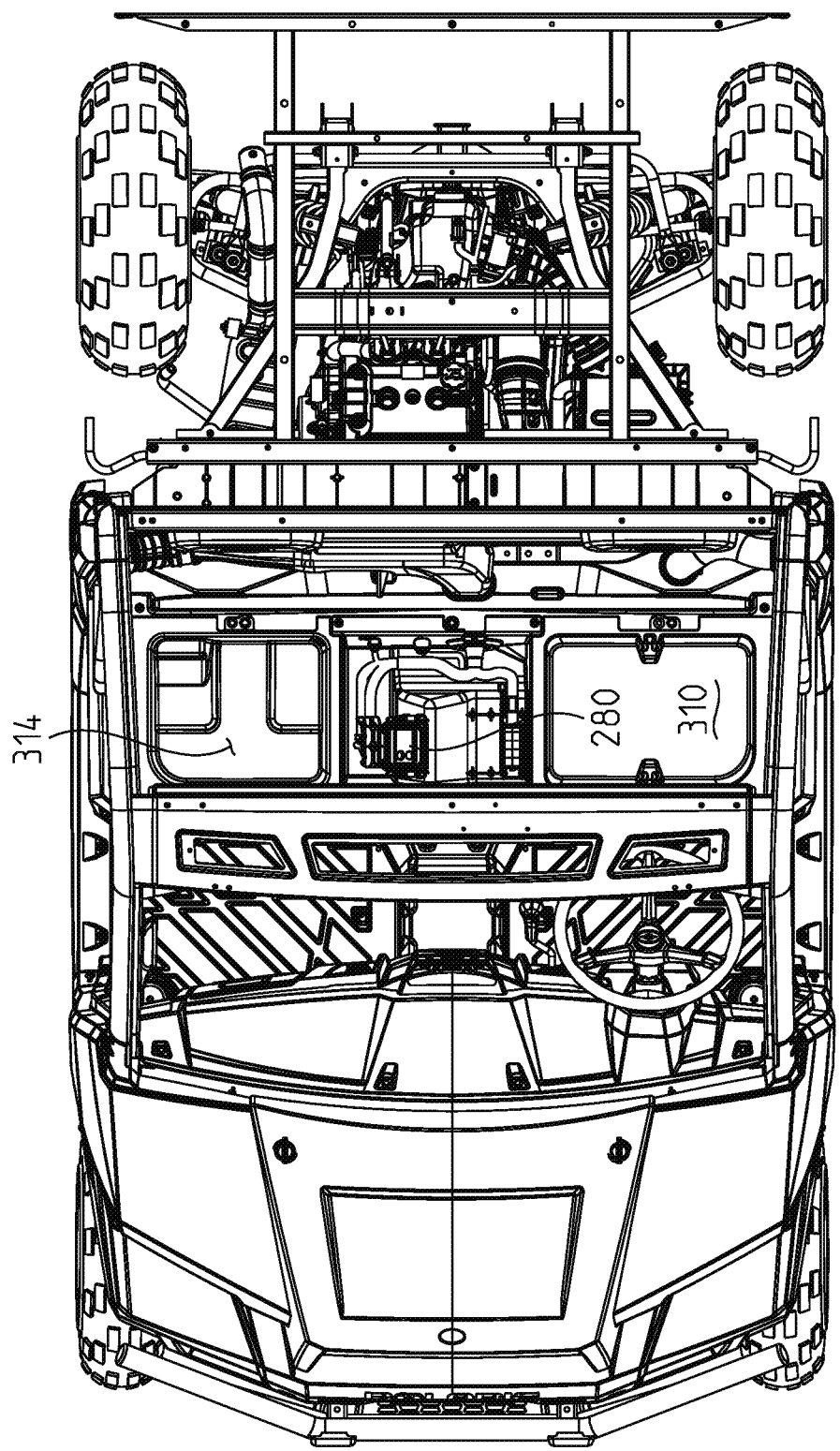
FIG. 17 is a top plan view of the vehicle of FIG. 16.

With respect now to FIGS. 16-17, vehicle 2 is finished off by floor board 300, side panel 302, seat side cover 304 and seat front cover 306. Storage pan 308 is positioned over frame 90 and over transverse bar 102 (FIG. 10) and includes three separate storage areas, namely storage area 310 directly below driver's seat, center storage area 312 accommodating the electronic assembly 280, and storage area 314 (FIGS. 12 and 17) positioned below passenger seating area. Panel 320 surrounds the intersection of rear roll cage portion 402 and plate 104 (FIG. 10) and a sound/heat shield 330 (FIG. 16) is positioned behind seat 32 and forward of engine 150 to prevent heat and noise from the engine 150 into the operator's area.

Figure 18:
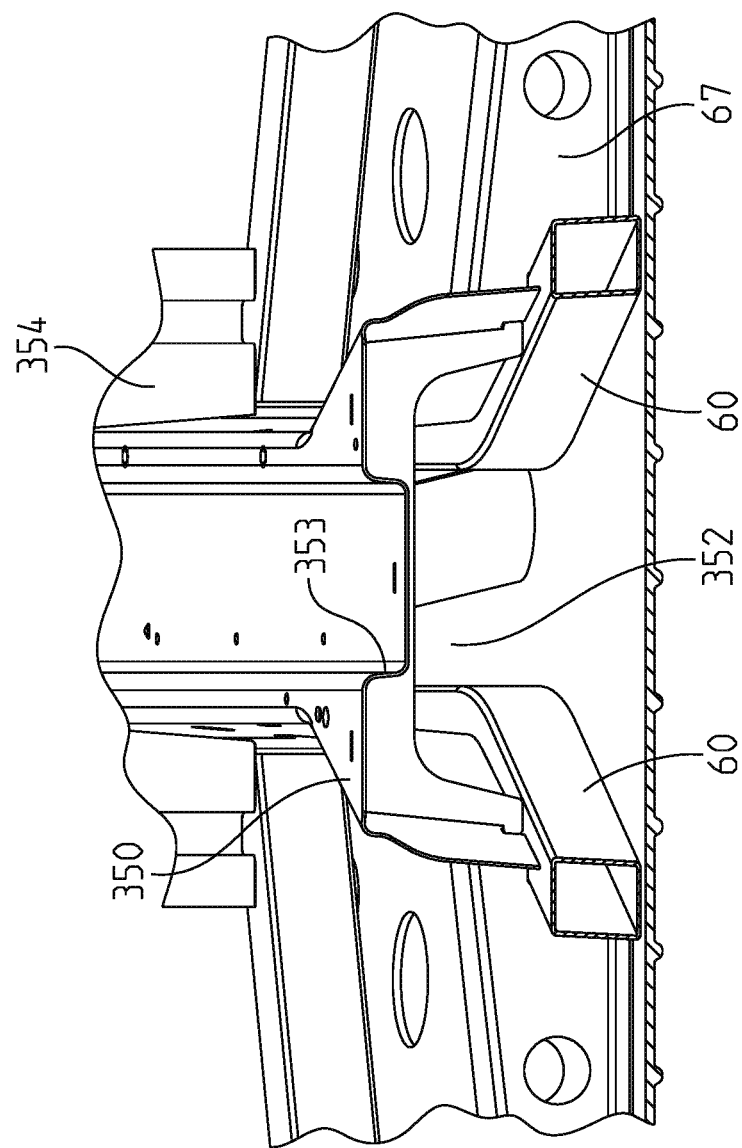
FIG. 18 is a cross sectional view through lines 18-18 of FIG. 9.

With reference now to FIGS. 9 and 18, a channel member 350 is positioned over frame tubes 60 from a position from the front 50 of the vehicle to a position extending over truss member 67 defining an opening 352 (FIG. 18). The channel member 350 defines an opening or tunnel between the front of the vehicle to a position under the seats for receiving the drive shaft that extends from the rear of the vehicle to the front of the vehicle for driving a front differential. The channel member 350 is coupled to the main frame tubes 60, 62 to define a rigid member resistant to torsion. The top of the channel 350 defines a passageway 353 for receiving other essentials extending from the front of the vehicle to the rear of the vehicle, such as a wiring harness (lights, electronic throttle control wiring, etc), cooling tubes, brake lines, etc. As shown best in FIGS. 3 and 18, a shear plate 354 also extends upwardly from frames tubes 62 to upper frame portion 356 also provided to resist torsion to the vehicle frame 4. Shear plate 354 also allows for the mounting of accessories thereto.

Figure 19:
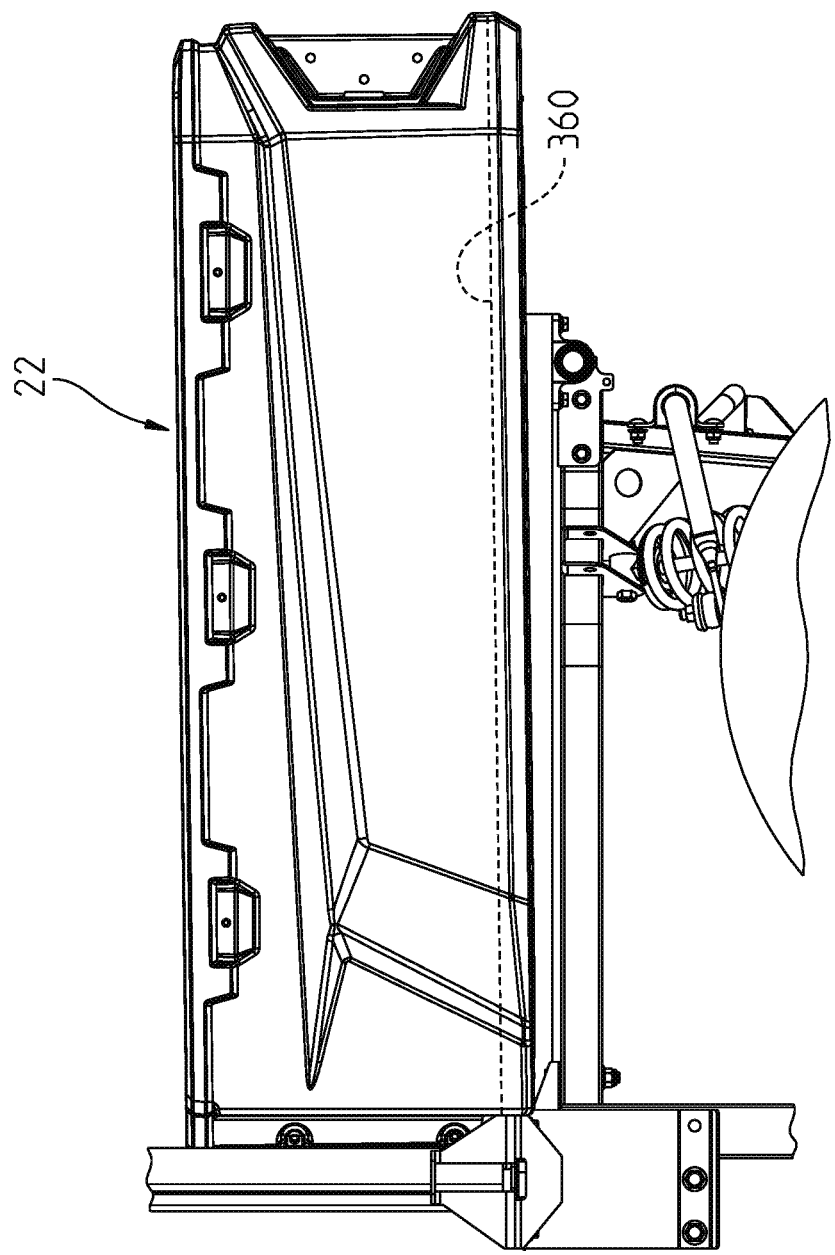
FIG. 19 shows a side view of the utility dump box.
Figure 20:
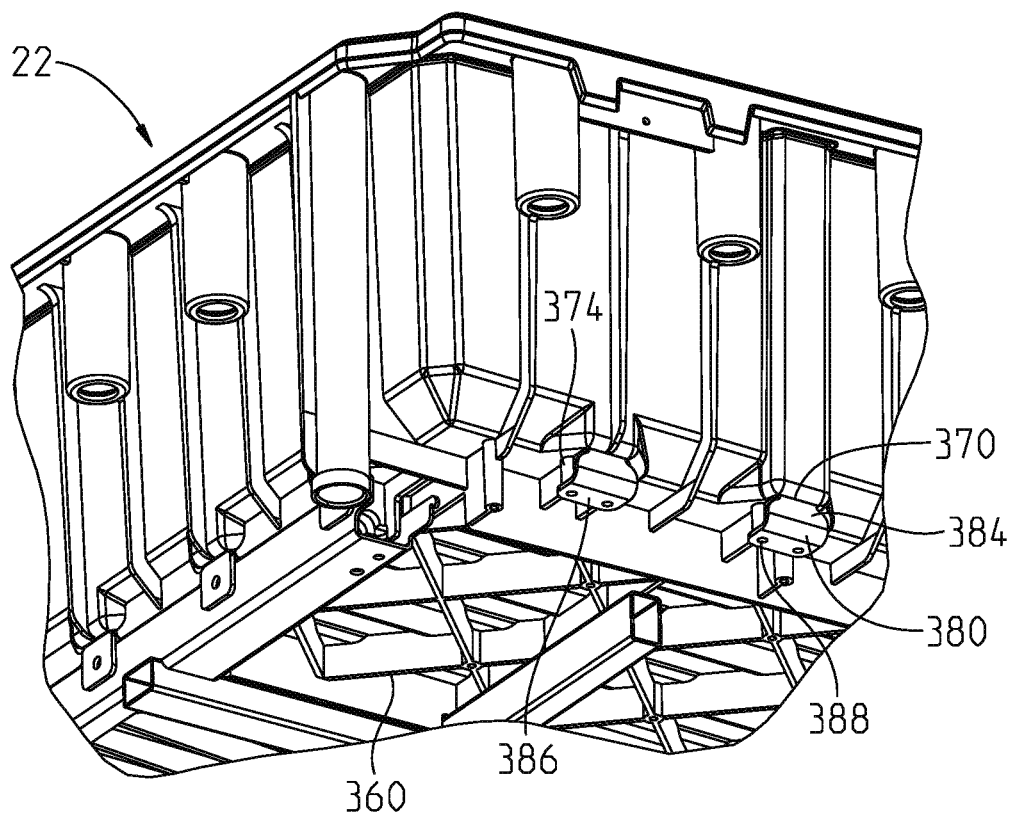
FIG. 20 shows an underside perspective view of a side of the utility dump box.
Figure 21:
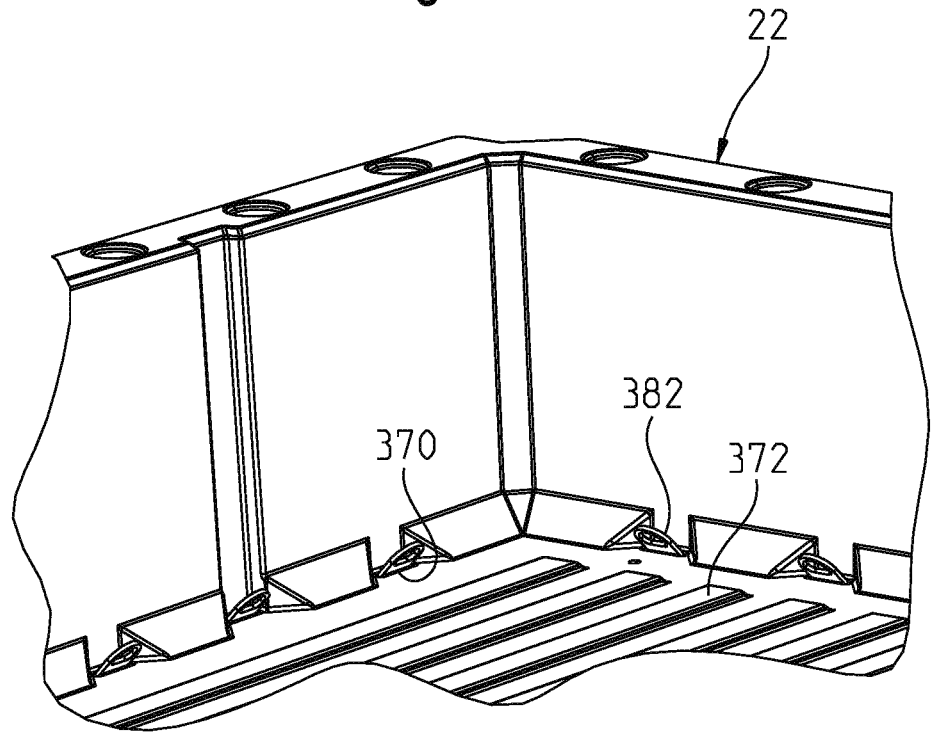
FIG. 21 shows integrated tie downs positioned in the utility dump box.
Figure 22:
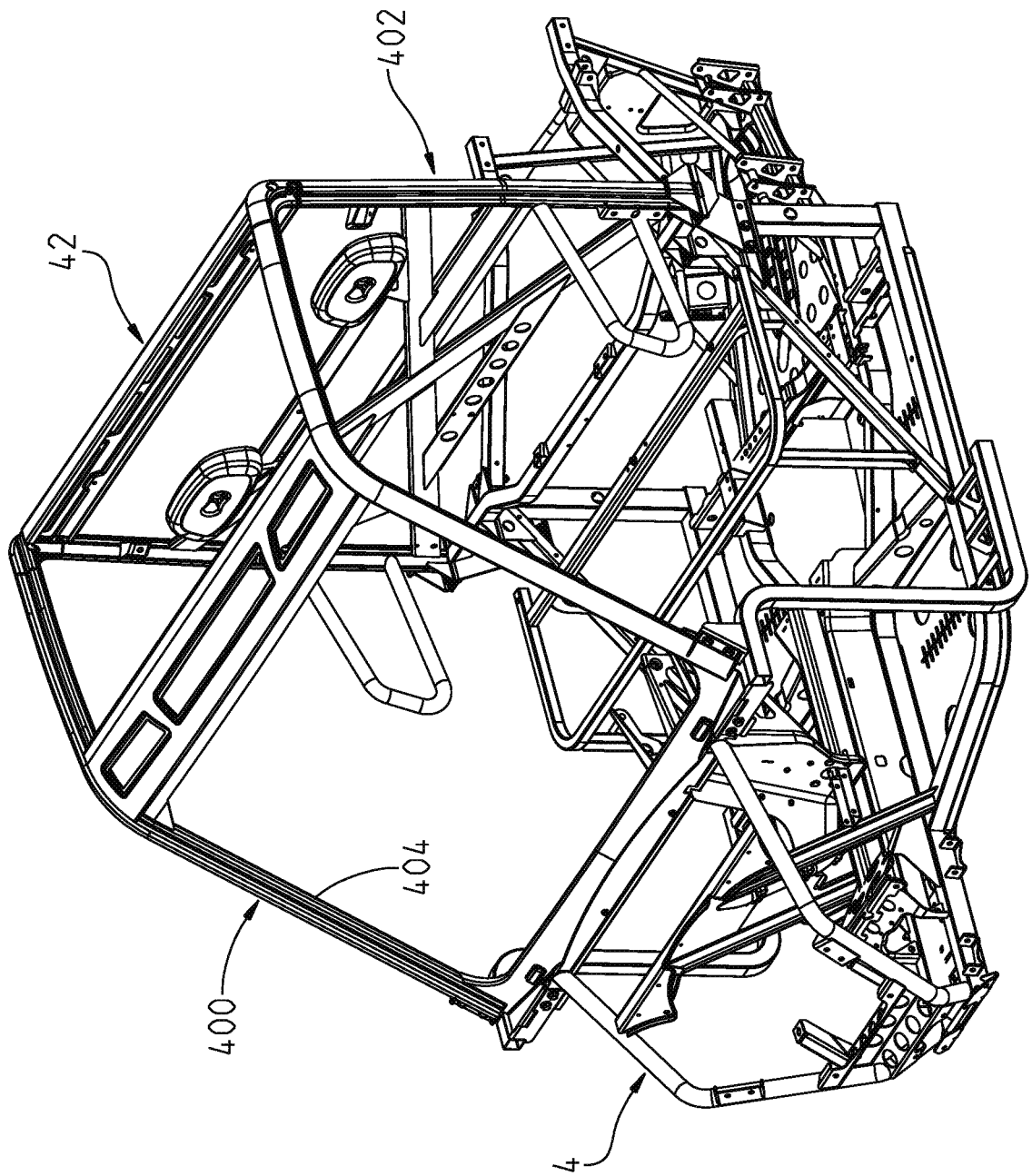
FIG. 22 is a left front perspective view of the roll cage attached to the frame.
Figure 23:
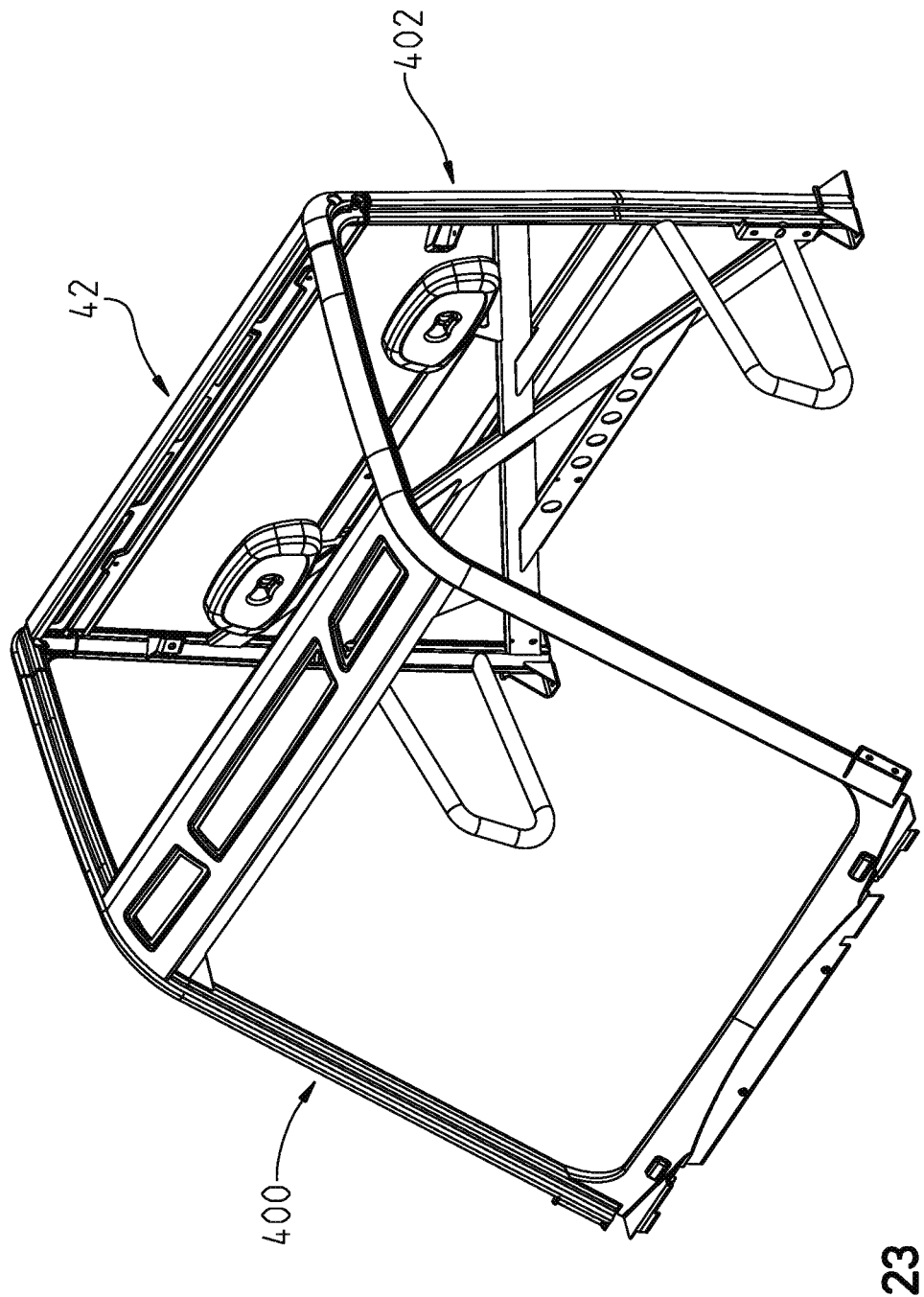
FIG. 23 is a left front perspective view of the roll cage.

With reference now to FIGS. 19-21, the rear utility box 22 is shown in greater detail. As shown in FIG. 19, the utility box 22 has an underside surface 360 which inclines upwardly and forwardly providing a small draft angled surface on the inside of the utility box. This provides for easier dumping of the contents of the utility box, as well as raises the inside surface of the utility box for clearance purposes due to the rearwardly adjusted engine 150 and transmission 152. Furthermore as shown in FIG. 21, the side edges of the utility box include a plurality of molded in slots 370 which extend downwardly through a floor 372 of the box, the slots extending outwardly of inwardly molded posts 374 (FIG. 20). Tie downs 380 are provided having an upwardly extending portion 382 for extending through slots 370, a shank portion 384 for extending downwardly through the slot, and a flange portion 386 for positioning against the post 374. Fasteners may be positioned through apertures 388 of the tie downs 382 fastening the tie downs to the utility box in a semi-fixed fashion. It should be understood that the tie downs may be positioned in alternate orientations as decided by the owner/user.

With reference now to FIGS. 22-26, the roll cage 50 will be described in greater detail. As shown, cage 50 includes a front cage portion 400 and a rear cage portion 402. As shown best in FIG. 24, front cage portion 400 includes upright portions 404, horizontal portions 406, crossbeam 408 and lower crossbeam 410. As defined, front cage portion 400 defines surfaces 412 of uprights 404, surface 414 of crossbeam 408 and surface 416 of lower crossbeam 410 all arranged in a plane for receiving an accessory windshield. In a like manner, surfaces 420 are defined on portions 406 and surface 422 is defined on overhead beam 408 to define a planar surface for receiving either an accessory overhead roof piece or see through moon roof. As shown, upright portions 404 include brackets 422 for connection to gussets 82 (FIG. 9). Finally, cage portion 400 includes rear connectors 424 for connection to rear cage portion 402 as described herein.

Figure 24:
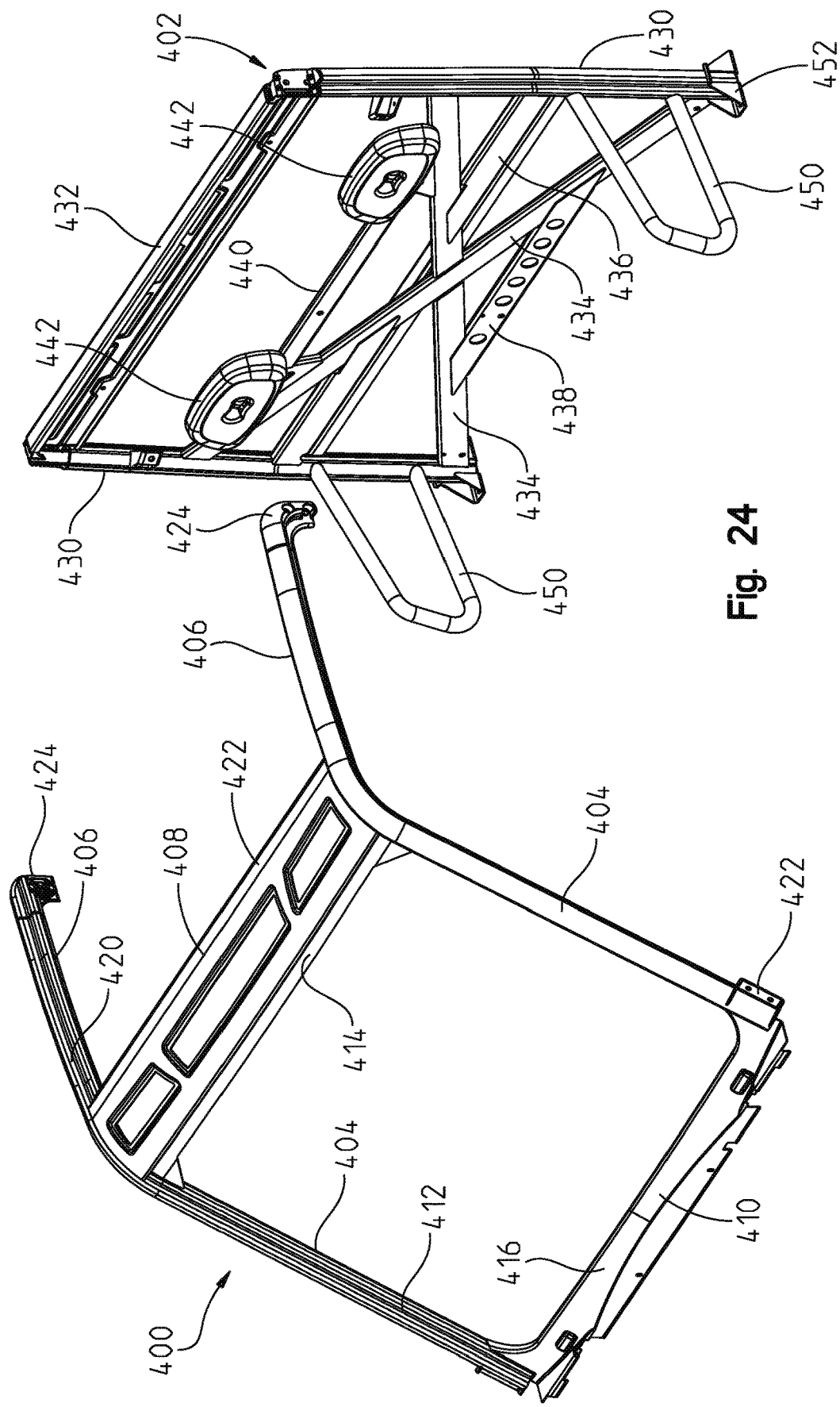
FIG. 24 shows the roll cage of FIG. 23 in an exploded fashion.
Figure 25:
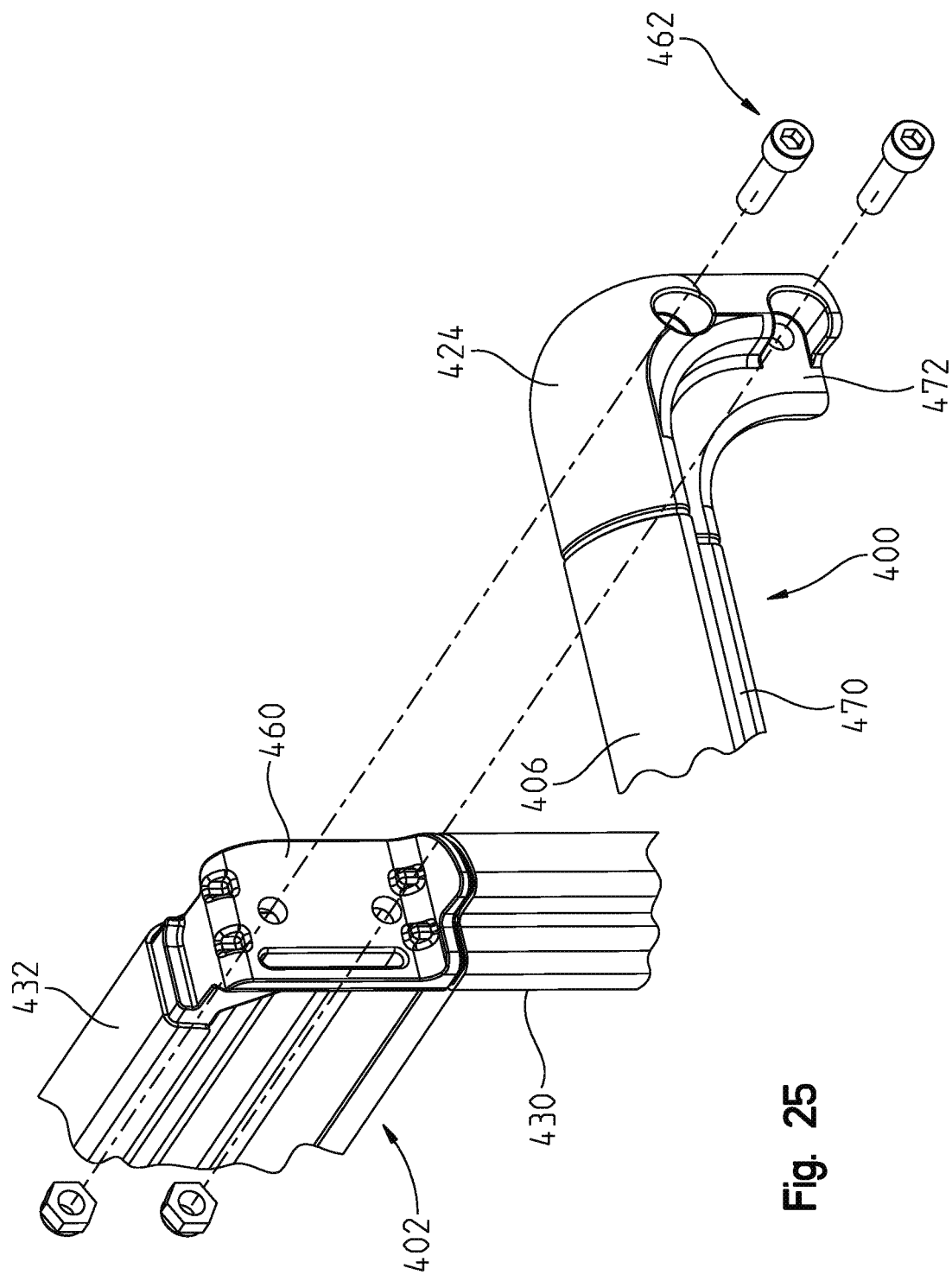
FIG. 25 shows an enlarged view of the connection points of the collapsible roll cage.
Figure 26:
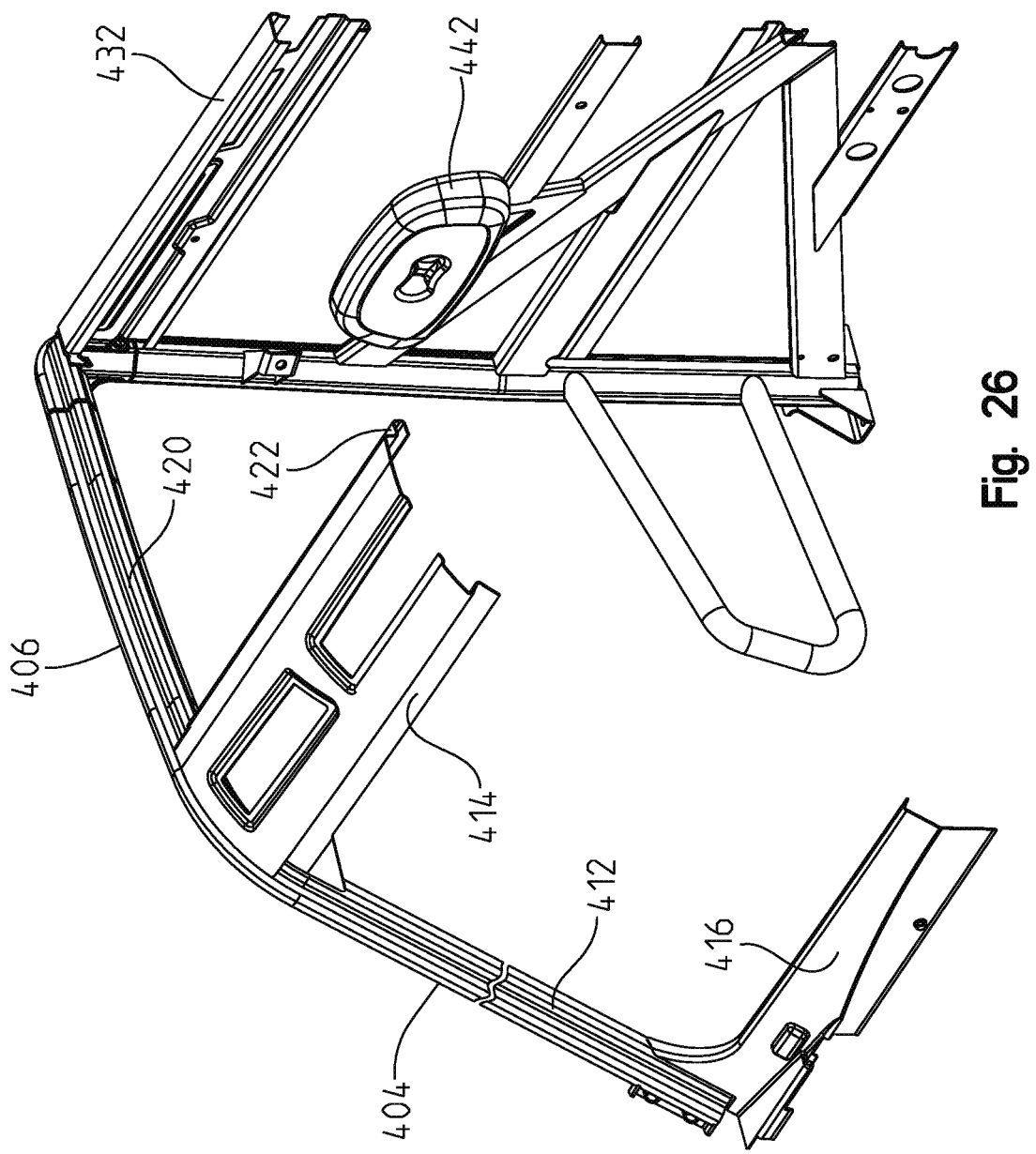
FIG. 26 shows a cross section of the roll cage showing the configuration of the components.
Figure 27:
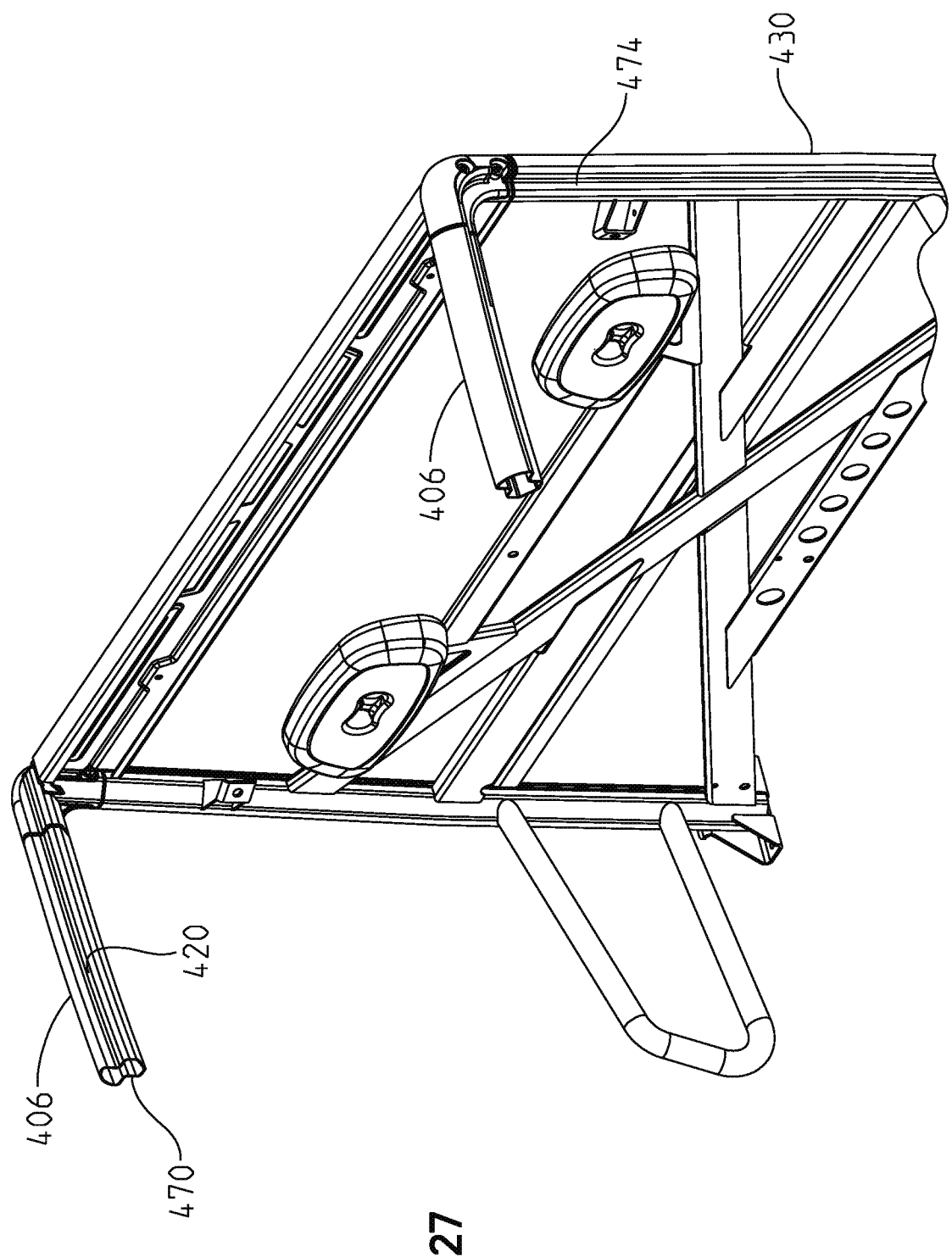
FIG. 27 shows a lateral cross section showing a cross section configuration of the lateral roll cage members.
Figure 30:
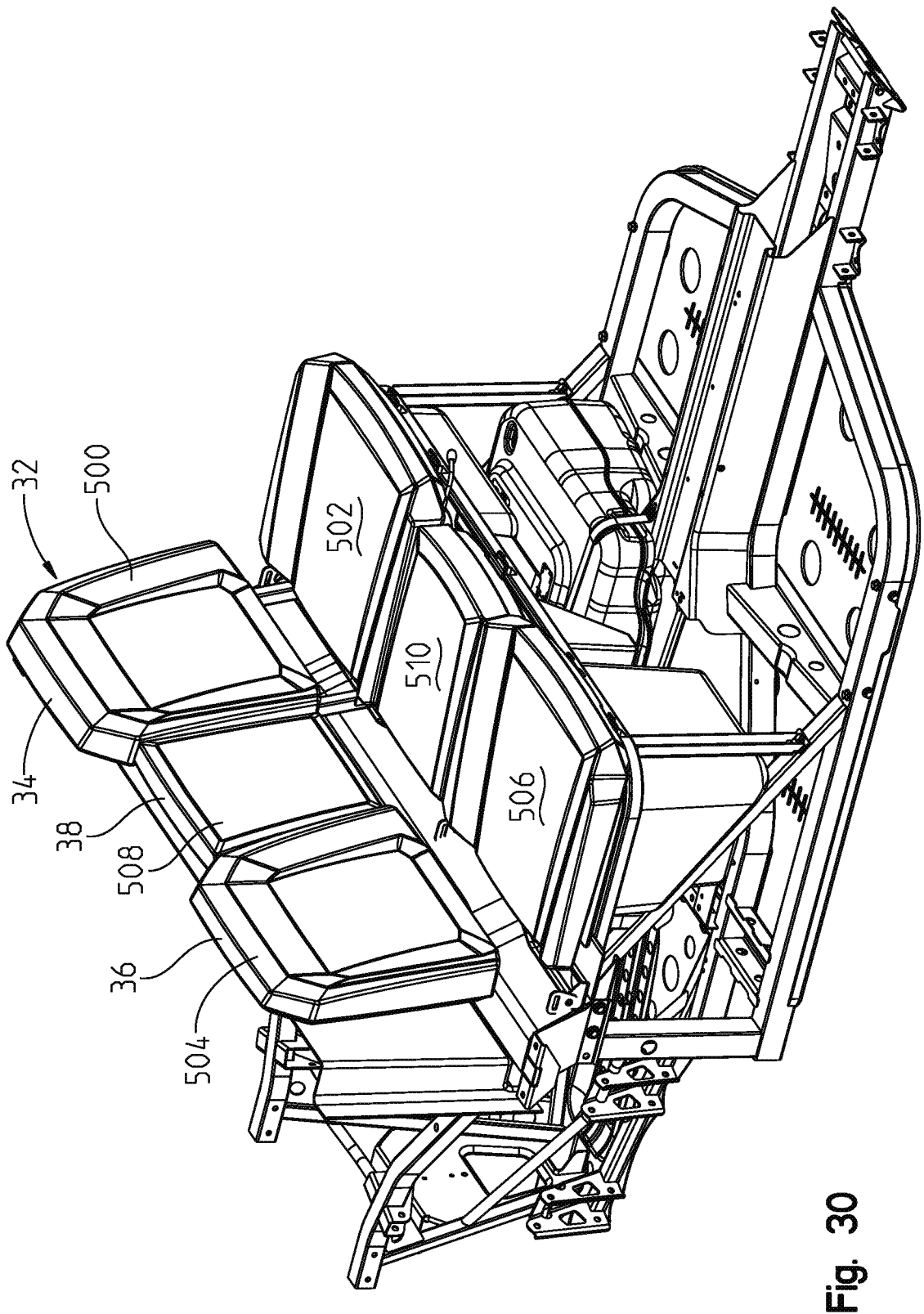
FIG. 30 is a right front perspective view of the seating assembly of FIG. 28.
Figure 31:
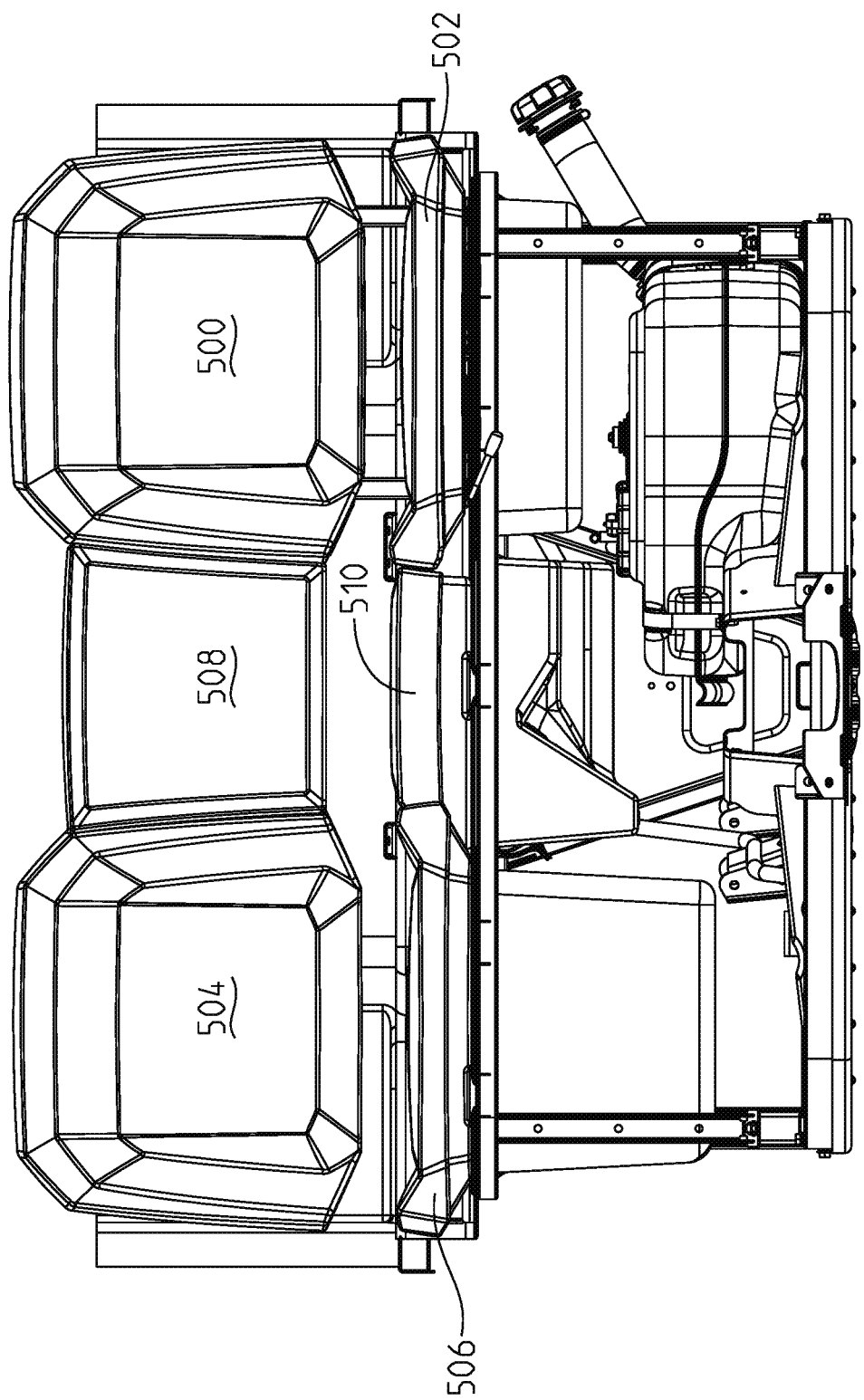
FIG. 31 is a front view of the seating assembly of FIG. 28.
Figure 32:
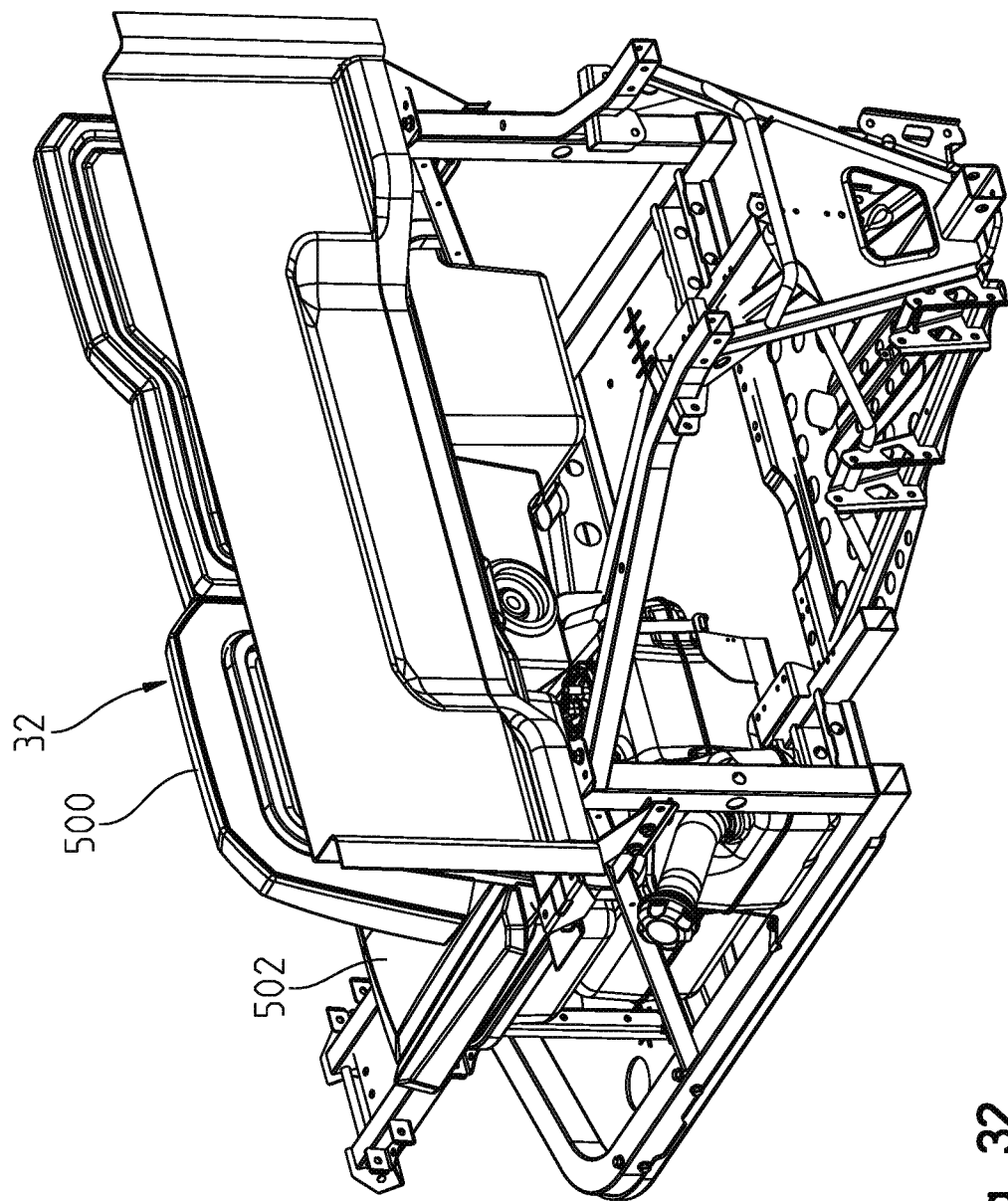
FIG. 32 is a left rear perspective view of the seating assembly of FIG. 28.

As shown best in FIG. 24, rear cage portion 402 includes uprights 430, cross member 432, diagonal braces 434, cross members 436 and 438 and cross member 440 retaining head rests 442. Side supports 450 extend forwardly from uprights 430. Rear portion 402 includes brackets 452 for attachment to upper flange 104 (FIG. 8). As shown best in FIG. 25, the intersection of upright 430 and cross member 432 defines a profile 460 for the receipt of connector 424. Thus, the front and rear cage portions 400, 402 are easily connectable by way of fasteners 462. As also shown in FIG. 25, cage portion 406 includes an outwardly facing surface or lip at 470 which is planar with a surface 472 on connector 424 and with surface 474 (FIG. 27) of rear upright 430. This allows for the addition of an accessory door. The exact configuration of the cross section of cage portion 406 is shown in FIG. 27 which is somewhat hourglass or a figure eight configuration.

With respect now to FIGS. 28-37, the seating assembly of the present disclosure will be described in greater detail. With reference first to FIG. 28, the seating assembly 32 is shown in an installed position in the seat frame 90. As shown, driver's seat 34 includes a seat back 500 and a seat bottom 502, passenger seat 36 includes a seat back 504 and a seat bottom 506; and center seat 38 includes a seat back 508 and a seat bottom 510.

Figure 33:
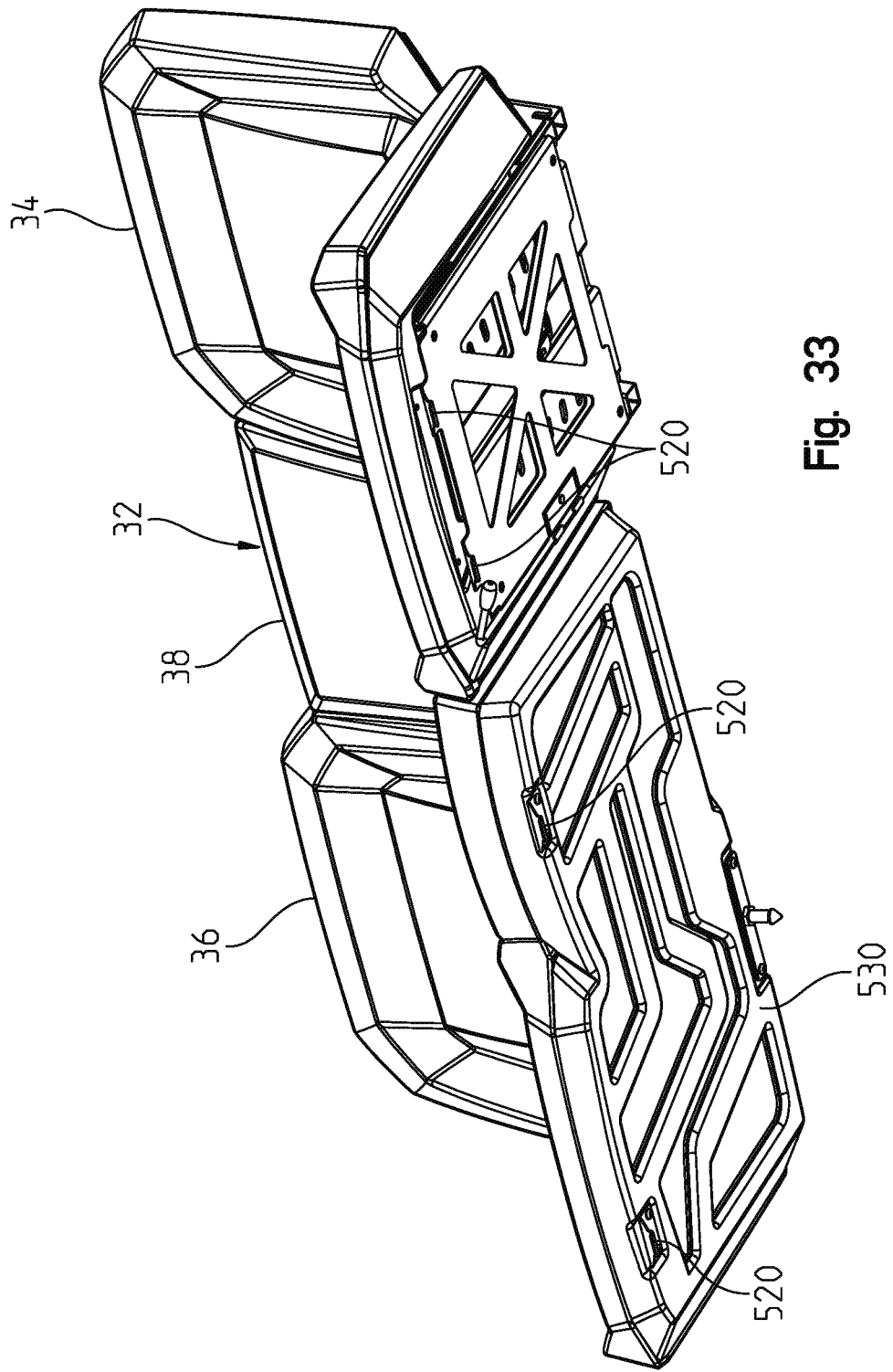
FIG. 33 is an underside perspective view of the seating assembly removed from the vehicle.
Figure 34:
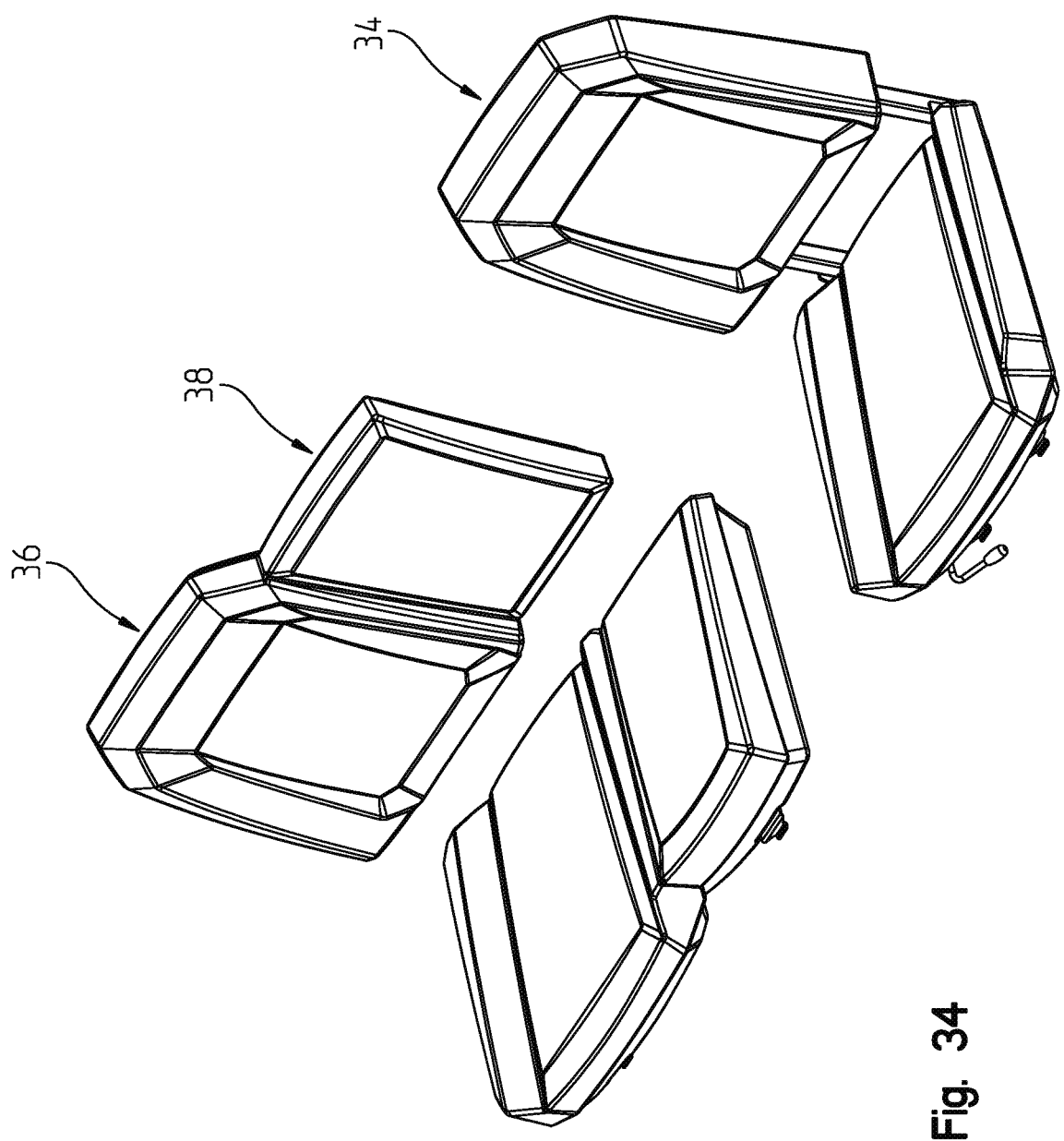
FIG. 34 shows the seating assembly of FIG. 33 exploded from one another.
Figure 35:
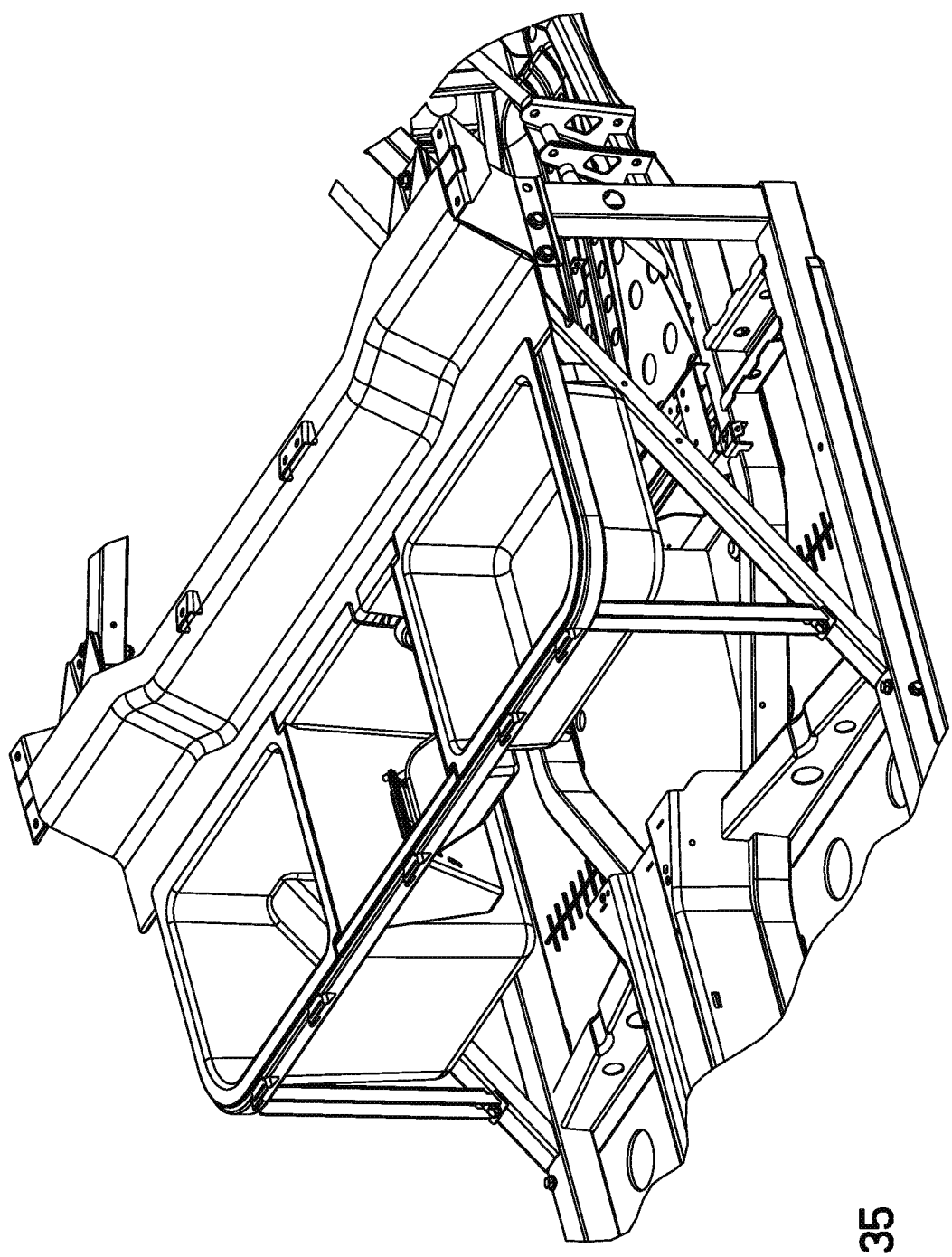
FIG. 35 shows the seat frame of the vehicle.
Figure 36:
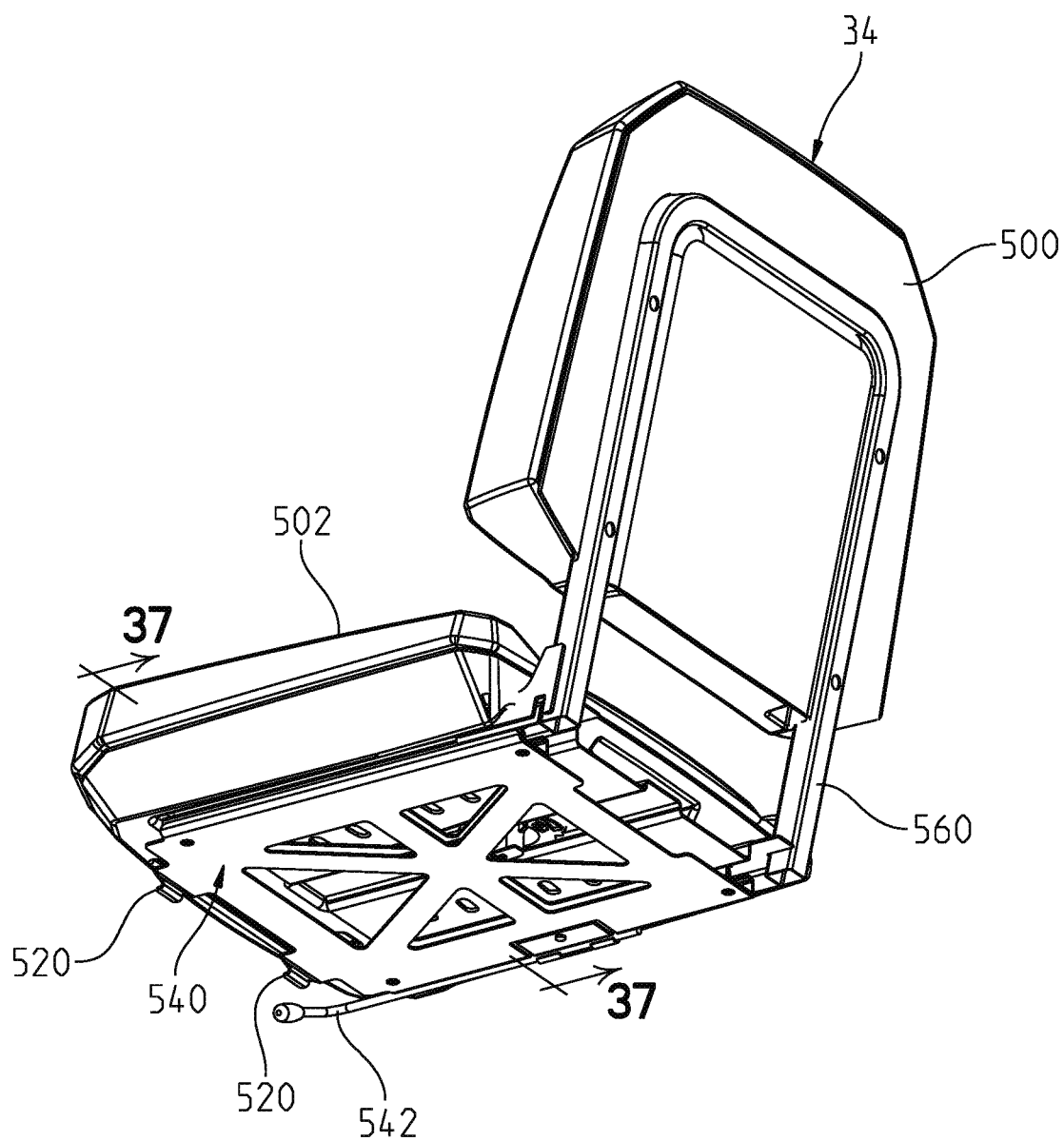
FIG. 36 shows an underside perspective view of the driver's seat.

As shown best in FIGS. 33, 34 and 36, the front edges of the seating assembly includes hooks 520 which are pivotally clipped into an opening 522 of a bracket 524 (FIG. 29) clipping the seats into the seat frame 90. It should be appreciated then that the seat can tip forward towards the steering wheel and/or the dash board of the vehicle for removal of the seats and for access to the storage bins under the seat.

As shown best in FIGS. 33 and 34, driver's seat 34 and the combined passenger seat 36 and center seat 38 are separate assemblies. As shown, the passenger seat 36 and center seat 38 would include a lower structural frame 530 upon which the seat bottom would be constructed, and to which hooks 520 would be assembled or integrated.

Figure 37:
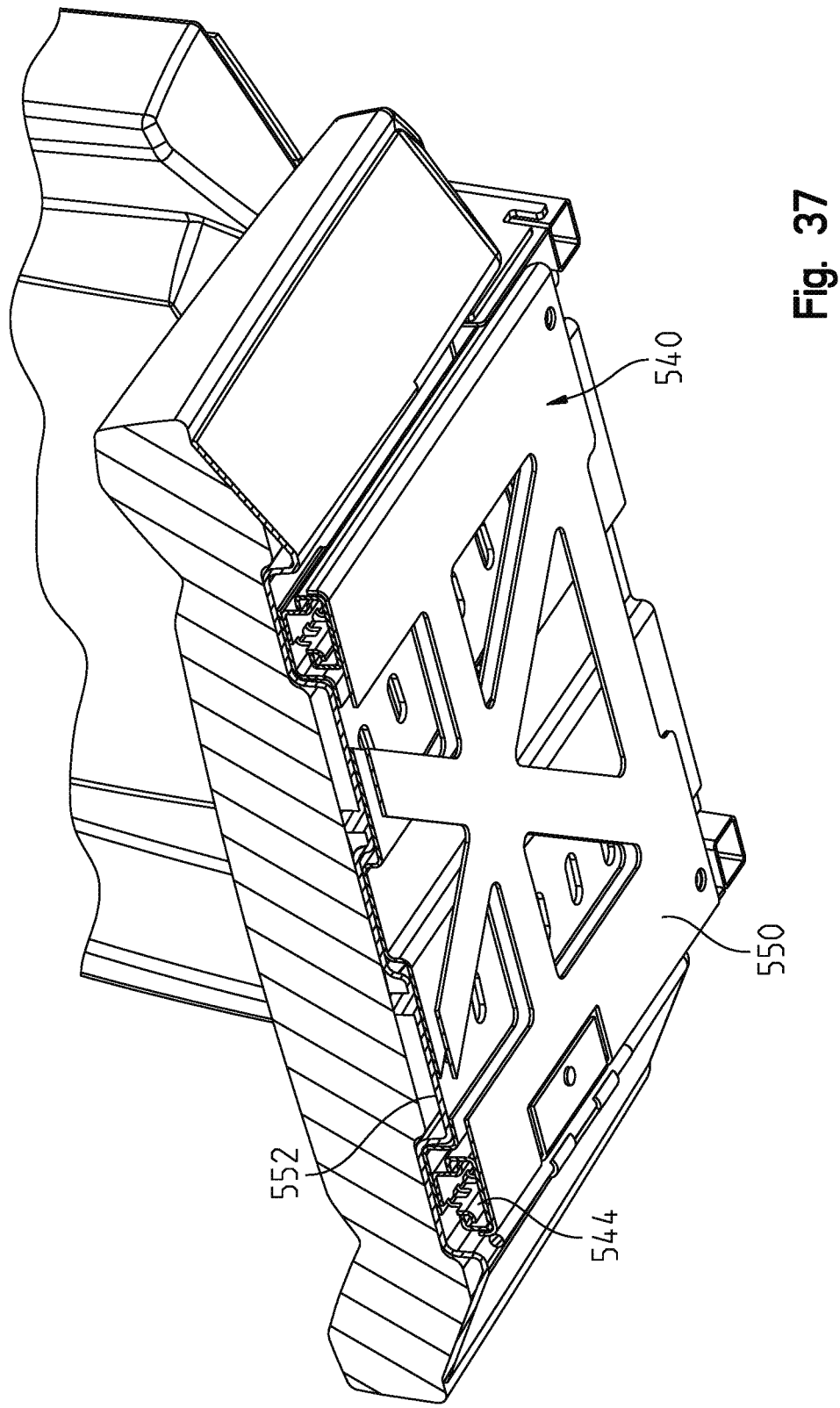
FIG. 37 shows a cross sectional view through lines 37-37 of FIG. 36.

As shown best in FIGS. 36 and 37, driver's seat 34 includes a lower slide assembly 540 to which hooks are provided. Seat 34 further includes an adjustment mechanism 542 as well as an inner slide track 544 (FIG. 37) allowing sliding movement between a lower track member 550 and an upper track member 552 of track assembly 540. Frame 560 of seat back 500 is attached to the lower track assembly 540, and thus when upper track portion 552 moves relative to lower track portion 550, seat back moves with seat bottom 502.

While the power source of the present disclosure is shown as a combustion engine, illustratively a combustion engine, the engine could also take on the form of a multi-fuel engine capable of utilizing various fuels. An exemplary multifuel engine capable of utilizing various fuels is disclosed in U.S. patent application Ser. No. 11/445,731 filed Jun. 2, 2006, (and counterpart PCT application number PCT/US07/70220), the disclosure of which is expressly incorporated by reference herein. In another embodiment, the power source could be a hybrid electric engine. In another embodiment, the power source could be an electric engine, where the spacing under the seats is utilized for the battery packs. An illustrative electric vehicle is shown in any one of assignee's applications, Ser. No. 12/484,921 filed Jun. 15, 2009 (and counterpart PCT application number PCT/US2010/38711) or Ser. No. 12/816,004 filed Dec. 16, 2010 the subject matter of which is incorporated herein by reference.

The vehicle could also include a range extender of the type disclosed in application Ser. No. 12/928,479 filed Dec. 13, 2010 (and counterpart PCT application number PCT/US2010/049167).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:

1. A utility vehicle, comprising:
a vehicle frame assembly including main frame tubes extending generally along a longitudinal axis and a seat frame positioned in a mid-portion of the vehicle frame assembly, and positioned at a raised position relative to the main frame tubes;
a cargo portion supported by the vehicle frame assembly, the cargo portion having a floor extending substantially parallel to the longitudinal axis, a plurality of side panels each having an upper extent and a lower extent, and the lower extent of each side panel of the plurality of side panels being joined to the floor; and
wherein at least one side panel of the plurality of side panels defines at least one indentation extending vertically from the upper extent to the lower extent.

2. The utility vehicle of claim 1, wherein a first side panel of the plurality of side panels is positioned opposite a second side panel of the plurality of side panels, and wherein the indentation of each of the first and second side panels are laterally aligned.

3. The utility vehicle of claim 1, wherein the floor defines at least one aperture at an intersection between the at least one side panel and the floor.

4. The utility vehicle of claim 1, wherein the floor defines at least one aperture and at least one tie-down member extends through the at least one aperture.

5. The utility vehicle of claim 1, wherein the floor defines at least one aperture and the at least one aperture is positioned at least partially within the indentation.

6. The utility vehicle of claim 1, wherein each indentation has a depth at least equal to a width of the indentation.

7. The utility vehicle of claim 6, wherein the depth of each indentation is less than a thickness of each side panel.

8. The utility vehicle of claim 1, wherein the cargo portion has an underside surface having an incline extending in a direction along the longitudinal axis, and the incline increasing along a forward direction towards the mid-portion of the frame.

9. The utility vehicle of claim 8, wherein the incline of the underside surface increases the space below the cargo portion available for accommodating the engine and the transmission.

10. The utility vehicle of claim 9, wherein an uppermost surface of the engine is positioned adjacent a forward extent of the cargo portion.

11. A utility vehicle, comprising:
a vehicle frame assembly including main frame tubes extending generally longitudinally and a seat frame positioned in a mid-portion of the vehicle frame assembly and at a raised position relative to the main frame tubes;
a cargo portion supported by the vehicle frame assembly, the cargo portion having a floor and a plurality of side panels extending vertically upward from the floor and each of the plurality of side panels having an upper end, a lower end, and an upper surface extending laterally from the upper end of each side panel; and
wherein the upper surface of each side panel defines at least one opening extending through the upper surface.

12. The utility vehicle of claim 11, wherein the at least one opening extends into a cylindrical body that extends from the upper surface vertically downward and substantially parallel to the plurality of side panels.

13. The utility vehicle of claim 12, wherein the cylindrical body extends from the upper surface to the floor.

14. The utility vehicle of claim 12, wherein the cylindrical body extends a length that is less than a length of each side panel.

15. The utility vehicle of claim 11, wherein the at least one opening includes a first opening and a second opening extending through the upper surface of each side panel.

16. The utility vehicle of claim 15, wherein each of the plurality of side panels comprises an indentation that extends vertically along each side panel of the plurality of side panels.

17. The utility vehicle of claim 16, wherein the indentation is positioned between the first opening and the second opening on each side panel.

18. A utility vehicle, comprising:
a vehicle frame assembly including main frame tubes extending generally
longitudinally and a seat frame positioned in a mid-portion of the vehicle frame assembly and at a raised position relative to the main frame tubes;
a cargo portion supported by the vehicle frame assembly and coupled to a rear portion of the vehicle seat frame, the cargo portion having a floor and at least a first side panel and a second side panel extending vertically upwards from the floor, the first and second side panels each having an upper end and an upper surface extending laterally outward from an upper end, and a junction defining an intersection between the first and second side panels; and
wherein each upper surface comprises an angled portion positioned adjacent one another such that the angled portions define an open volume adjacent the junction.

19. The utility vehicle of claim 18, wherein the open volume is configured for receiving the rear portion of the vehicle seat frame.

20. The utility vehicle of claim 18, wherein the first side panel is positioned at a front end of the cargo portion and includes two angled portions, such that the cargo portion includes two open volumes configured to interface with the rear portion of the vehicle seat frame.

21. The utility vehicle of claim 18, wherein the upper surface of each side panel defines a plurality of openings.

22. The utility vehicle of claim 21, wherein a first opening of the plurality of openings is positioned on a first side of the open volume and a second opening of the plurality of openings is positioned on a second side of the open volume, the first side positioned opposite the second side.

* * * * *